US010820375B2

(12) United States Patent
Park et al.

(10) Patent No.: US 10,820,375 B2
(45) Date of Patent: Oct. 27, 2020

(54) METHOD AND APPARATUS FOR TURNING ON WI-FI INFRASTRUCTURE USING BLE INTERFACE IN WIRELESS COMMUNICATION SYSTEM

(71) Applicant: LG ELECTRONICS INC., Seoul (KR)

(72) Inventors: Giwon Park, Seoul (KR); Jingu Choi, Seoul (KR); Byungjoo Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/901,687

(22) Filed: Feb. 21, 2018

(65) Prior Publication Data

US 2019/0141786 A1 May 9, 2019

Related U.S. Application Data

(60) Provisional application No. 62/582,867, filed on Nov. 7, 2017.

(51) Int. Cl.
| | |
|---|---|
| *H04W 92/18* | (2009.01) |
| *H04L 29/06* | (2006.01) |
| *H04W 4/80* | (2018.01) |
| *H04W 76/14* | (2018.01) |
| *H04W 52/02* | (2009.01) |
| *H04W 88/06* | (2009.01) |
| *H04L 29/08* | (2006.01) |
| *H04W 84/12* | (2009.01) |
| *H04W 8/00* | (2009.01) |
| *H04W 48/16* | (2009.01) |

(Continued)

(52) U.S. Cl.
CPC ......... *H04W 92/18* (2013.01); *H04L 65/1069* (2013.01); *H04L 65/602* (2013.01); *H04L 65/608* (2013.01); *H04W 4/80* (2018.02); *H04W 52/028* (2013.01); *H04W 52/0216* (2013.01); *H04W 52/0229* (2013.01); *H04W 76/14* (2018.02); *H04W 88/06* (2013.01); H04L 67/16 (2013.01); *H04W 8/005* (2013.01); *H04W 8/24* (2013.01); *H04W 48/10* (2013.01); *H04W 48/16* (2013.01); *H04W 84/12* (2013.01)

(58) Field of Classification Search
CPC ....... H04W 92/18; H04W 76/14; H04W 4/80; H04W 8/005; H04W 84/12; H04L 65/608
See application file for complete search history.

(56) References Cited

U.S. PATENT DOCUMENTS 9,155,026 B2 * 10/2015 Wang .................... H04W 48/10
2013/0178160 A1 * 7/2013 Wang .................... H04W 48/10
455/41.2

(Continued)

*Primary Examiner* — Khaled M Kassim
(74) *Attorney, Agent, or Firm* — Dentons US LLP

(57) ABSTRACT

In an aspect of the present invention, provided herein is a method for turning on a Wi-Fi interface based on a Bluetooth Low Energy (BLE) interface by a first station (STA) in a wireless communication system, including: exchanging an advertising packet with a second STA based on the BLE interface; transmitting a first message to the second STA based on the BLE interface; and receiving a second message from the second STA based on the BLE interface. In this case, the Wi-Fi interface may be turned on based on the advertising packet, and information related to the Wi-Fi interface may be exchanged through the first and second messages.

8 Claims, 21 Drawing Sheets

(51) Int. Cl.
 *H04W 48/10* (2009.01)
 *H04W 8/24* (2009.01)

(56) References Cited

U.S. PATENT DOCUMENTS

| | | | |
|---|---|---|---|
| 2015/0296416 A1* | 10/2015 | Lee | H04W 8/005 |
| | | | 370/331 |
| 2016/0050551 A1* | 2/2016 | Qi | H04W 48/10 |
| | | | 455/434 |
| 2016/0278006 A1* | 9/2016 | Lee | H04W 76/10 |
| 2016/0337689 A1* | 11/2016 | Yoshimura | H04N 21/42607 |
| 2016/0353233 A1* | 12/2016 | Yong | H04W 76/10 |
| 2016/0353425 A1* | 12/2016 | Iwami | H04N 21/436 |
| 2017/0134504 A1* | 5/2017 | Takahashi | H04L 67/2823 |
| 2017/0223579 A1* | 8/2017 | Lee | H04W 48/14 |
| 2018/0027490 A1* | 1/2018 | Liu | G08C 17/02 |
| | | | 370/311 |
| 2019/0020741 A1* | 1/2019 | Knaappila | H04L 69/321 |

\* cited by examiner

First WFD device (cellular phone)   Second WFD device (display device)

| AD length (1 byte) | Transport Discovery Data AD Type Code (1 bytes) | Org. ID (1 byte) | TDS Flag (1 byte) | Length (1 byte) | Org. Data (0-26 bytes) |
|---|---|---|---|---|---|

| Transport Availability (1 byte) | Active Transport (1 byte) | Service Hash Type (B0-B1) | Band Support (B2-B5) | Address bit (B6) | Reserved (B7) | Service Hash/ Bloom Filter Bit Array (6 Or 12 bytes) | AdvA Or SeekA (0 Or 6 bytes) | Transport Type (1 byte) | Transport Specific Information |
|---|---|---|---|---|---|---|---|---|---|
| · B0 Infra · B1 P2P · B2 NAN · B3+B5 Reserved · B7 Vendor Specific | · B0 Infra On/Off · B1 P2P On/Off · B2 NAN On/Off · B3+B5 Reserved · B7 Vendor Specific On/Off | B0 "0" Service Hash "1" Bloom Filter used in the Service Hash/ B1 Bloom Filter Bit Array field "0" 6-octet "1" 12-octet length is used in the Service Hash/Bloom Filter Bit Array field Note: B1 can only set to "0" when TDS Flag0 bito B0B1 are set "01" or "10" | · B2 2.4GHz support · B3 5 GHz support · B4 1 ah support · B5 60 GHz support | · "0" AdvA or SeekA field is empty · "1" AdvA or SeekA field is present | · set to "0" | · if B0 is "0", this field is interpreted as one or two 6-octet service hash(s) · if B0 is "1", this field is interpreted as one or two-octet Bloom Filter Bit Array · if TDS Flags bite B0B1 is "01", this field is used for Subscribe only and the length maybe 6/12 octets as indicated by B1 · if TDS Flags bite B0B1 is "10", this field is used for Publish only and the length maybe 6/12 octets as indicated by B1 · if TDS Flags bite B0B1 is "11", this field is used for Subscribe and Publish and the length is 12 octets as indicated by B1. The 1st 6-octet is for subcribe and the 2nd octet is for publish | · AdvA or SeekA when responding to a message ADv_NONCO NN_IND | · B0 Infra info present · B1 P2P info present · B2 NAN info present · B3-B6 Reserved · B7 Vendor Specific info present | · Transport Specific Information (see next slide) |

METHOD AND APPARATUS FOR TURNING ON WI-FI INFRASTRUCTURE USING BLE INTERFACE IN WIRELESS COMMUNICATION SYSTEM

This application claims the benefit of U.S. Provisional Application No. 62/582,867, filed on Nov. 7, 2017, which is hereby incorporated by reference as if fully set forth herein.

BACKGROUND OF THE INVENTION

Field of the Invention

The present invention relates to a wireless communication system, and more particularly, to a method and apparatus for turning on a Wi-Fi infrastructure using a Bluetooth Low Energy (BLE) interface in a wireless communication system.

Discussion of the Related Art

Wireless access systems have been widely deployed to provide various types of communication services such as voice or data. In general, a wireless access system is a multiple access system that may support communication of multiple users by sharing available system resources (e.g., a bandwidth, transmission power, etc.). For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a multi carrier frequency division multiple access (MC-FDMA) system.

Recently, various wireless communication technologies have been developed with the advancement of information communication technology. Among the wireless communication technologies, a wireless local area network (WLAN) is the technology capable of accessing the Internet by wireless in a home, a company or a specific service provided area through portable device such as a personal digital assistant (PDA), a laptop computer, a portable multimedia player (PMP), etc. based on a radio frequency technology.

A standard for a WLAN (wireless local area network) technology is developing by IEEE (institute of electrical and electronics engineers) 802.11 group. IEEE 802.11a and b use an unlicensed band on 2.4 GHz or 5 GHz, IEEE 802.11b provides transmission speed of 11 Mbps and IEEE 802.11a provides transmission speed of 54 Mbps. IEEE 802.11g provides transmission speed of 54 Mbps by applying OFDM (orthogonal frequency division multiplexing) on 2.4 GHz. IEEE 802.11n provides transmission speed of 300 Mbps by applying MIMO-OFDM (multiple input multiple output-orthogonal frequency division multiplexing). IEEE 802.11n supports a channel bandwidth up to 40 MHz. In this case, transmission speed can be provided as fast as 600 Mbps. IEEE 802.11p corresponds to a standard for supporting WAVE (wireless access in vehicular environments). For instance, 802.11p provides improvement necessary for supporting ITS (intelligent transportation systems). IEEE 802.11ai corresponds to a standard for supporting fast initial link setup of IEEE 802.11 station.

A DLS (direct link setup)-related protocol in wireless LAN environment according to IEEE 802.11e is used on the premise of a QBSS (quality BSS) supporting QoS (quality of service) supported by a BSS (basic service set). In the QBSS, not only a non-AP STA but also an AP corresponds to a QAP (quality AP) supporting QoS. Yet, in current commercialized wireless LAN environment (e.g., wireless LAN environment according to IEEE 802.11a/b/g etc.), although a non-AP STA corresponds to a QSTA (quality STA) supporting QoS, most of APs corresponds to a legacy AP incapable of supporting QoS. Consequently, in the current commercialized wireless LAN environment, there is a limit in that a QSTA is unable to use a DLS service.

In a recent situation that such a wireless short-range communication technology as Wi-Fi and the like is widely applied to a market, connection between devices is performed not only based on a local network but also based on direct connection between devices. One of technologies enabling devices to be directly connected is Wi-Fi Direct.

Wi-Fi Direct corresponds to a network connectivity standard technology describing up to operations of a link layer. Since there is no definition on a regulation or a standard for an application of a higher layer, it is difficult to have compatibility and consistency of an operation after Wi-Fi Direct devices are connected with each other. For this reason, such a standard technology including higher layer application technology as WFDS (Wi-Fi Direct service) is under discussion by WFA (Wi-Fi alliance).

The WFA has announced such a new standard for delivering data via a direct connection between mobile devices as Wi-Fi Direct. Hence, related industries are actively developing a technology for satisfying the Wi-Fi Direct standard. In a strict sense, the Wi-Fi Direct is a marketing terminology and corresponds to a brand name. A technology standard for the Wi-Fi Direct is commonly called Wi-Fi P2P (peer to peer). Hence, the present invention describing Wi-Fi-based P2P technology may be able to use Wi-Fi Direct and Wi-Fi P2P without any distinction. In a legacy Wi-Fi network, a user accesses the legacy Wi-Fi network via an AP (access point) and accesses the Internet to use a device on which Wi-Fi is mounted. A data communication method via direct connection between devices is also used in a legacy communication by some users in a manner of being mounted on a device (e.g., a cellular phone, a note PC, etc.) on which a wireless communication technology such as Bluetooth is mounted. Yet, according to the data communication method, transmission speed is slow and transmission distance is limited to within 10 m. In particular, when the data communication method is used for transmitting massive data or is used in environment at which many Bluetooth devices exist, there exists a technical limit in performance capable of being felt by a user.

Meanwhile, Wi-Fi P2P maintains most of functions of the legacy Wi-Fi standard and includes an additional part for supporting direct communication between devices. Hence, the Wi-Fi P2P can sufficiently utilize hardware and physical characteristics of a device on which a Wi-Fi chip is mounted and is able to provide device-to-device P2P communication by upgrading a software function only.

As widely known, the device on which the Wi-Fi chip is mounted is extending to various ranges including a note PC, a smartphone, a smart TV, a game console, a camera and the like. For the device, sufficient numbers of suppliers and technology development personnel have been formed. Yet, software development supporting the Wi-Fi P2P standard is not vitalized yet. This is because, although a Wi-Fi P2P standard is announced, related software capable of conveniently using the Wi-Fi P2P standard is not distributed.

There exists a device playing a role of an AP in a legacy infrastructure network in a P2P group. The device is called a P2P group owner (GO) in a P2P standard. Various P2P clients may exist on the basis of the P2P GO. One GO exists in a single P2P group only and all remaining devices become client devices.

Moreover, in recent years, use of the BLE has been increased. Thus, a method for providing a service in an environment in which a plurality of systems or interfaces are provided needs to be developed.

SUMMARY OF THE INVENTION

Accordingly, an object of the present invention is to provide a method for turning on a Wi-Fi infrastructure using a BLE interface in a wireless communication system.

Another object of the present invention is to provide a method for exchanging information related to Wi-Fi Display using a BLE interface in a wireless communication system.

A further object of the present invention is to provide a method for exchanging messages based on a BLE interface in a wireless communication system.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for turning on a Wi-Fi interface based on a Bluetooth Low Energy (BLE) interface by a first station (STA) in a wireless communication system, the method comprising: exchanging an advertising packet with a second STA based on the BLE interface; transmitting a first message to the second STA based on the BLE interface; and receiving a second message from the second STA based on the BLE interface, wherein the Wi-Fi interface is turned on based on the advertising packet, and wherein information related to the Wi-Fi interface is exchanged through the first and second messages.

In accordance with another aspect of the present invention, a first station (STA) for turning on a Wi-Fi interface based on a Bluetooth Low Energy (BLE) interface in a wireless communication system, the first STA comprising: a receiver configured to receive information from an external STA; a transmitter configured to transmit information to the external STA; and a processor for controlling the receiver and the transmitter, wherein the processor is configured to exchange an advertising packet with a second STA based on the BLE interface, transmit a first message to the second STA based on the BLE interface, and receive a second message from the second STA based on the BLE interface, wherein the Wi-Fi interface is turned on based on the advertising packet, and wherein information related to the Wi-Fi interface is exchanged through the first and second messages.

Information on whether the Wi-Fi interface is supported; information on whether the Wi-Fi interface is an ON state or an OFF state; information on whether the Wi-Fi interface is available; and information on a Wi-Fi service may be further indicated through the advertising packet.

The information related to the Wi-Fi interface exchanged through the first and second messages may include at least one of: Wi-Fi Display (WFD) Real Time Streaming Protocol (RTSP) M1 information; WFD RTSP M2 information; and WFD RTSP M3 information.

Each piece of the WFD RTSP M1 information, the WFD RTSP M2 information, and the WFD RTSP M3 information may include RTSP option information.

The first message may include a field for requesting the WFD RTSP M1 information or the WFD RTSP M3 information from the second STA and the WFD RTSP M2 information as RTSP option information for the first STA.

The second message may include the WFD RTSP M1 information or the WFD RTSP M3 information as RTSP option information for the second STA in response to the first message.

The first message corresponds to a BLE Scan_Request message, and wherein the second message corresponds to a BLE Scan_Response message.

The BLE Scan_Request message and the BLE Scan_Response message may be exchanged in a process in which STA and service discovery is performed through the BLE interface.

GATT Write Request message and the GATT Notification message may be exchanged in a state in which the BLE interface is connected.

The first message may correspond to a GATT Write Request message, and the second message may correspond to a GATT Notification message.

According to the present invention, it is possible to provide a method for turning on a Wi-Fi infrastructure using a BLE interface in a wireless communication system.

According to the present invention, it is possible to provide a method for exchanging information related to Wi-Fi Display using a BLE interface in a wireless communication system.

According to the present invention, it is possible to provide a method for exchanging messages based on a BLE interface in a wireless communication system.

It will be appreciated by persons skilled in the art that the effects that can be achieved through the present invention are not limited to what has been particularly described hereinabove and other advantages of the present invention will be more clearly understood from the following detailed description.

BRIEF DESCRIPTION OF THE DRAWINGS

FIG. 17 is a diagram illustrating a method for performing BLE advertising.

DETAILED DESCRIPTION OF THE INVENTION

Figure 1:
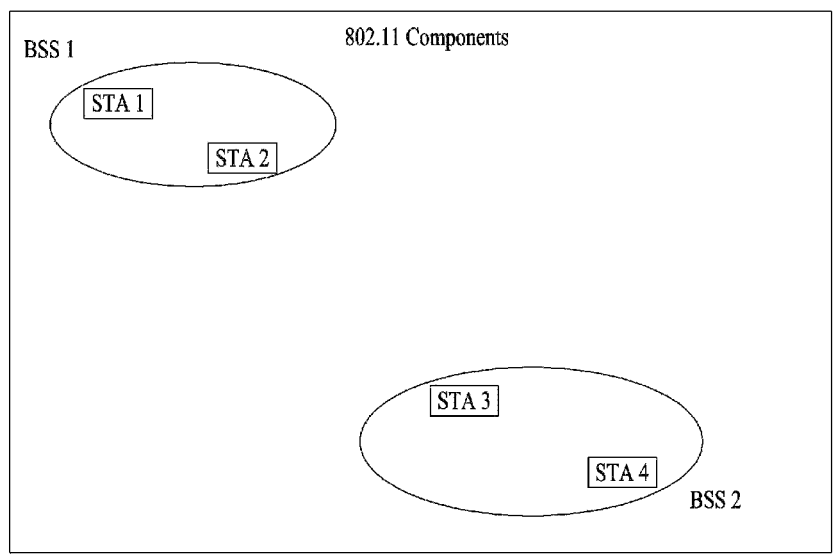
FIG. 1 illustrates a structure of an IEEE 802.11 system to which the present invention can be applied.

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide the full understanding of the present invention. However, it will be apparent to those skilled in the art that the present invention may be implemented without such specific details.

The following embodiments can be achieved by combinations of structural elements and features of the present invention in prescribed forms. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment.

Specific terminologies in the following description are provided to help the understanding of the present invention. And, these specific terminologies may be changed to other formats within the technical scope or spirit of the present invention.

Occasionally, to avoid obscuring the concept of the present invention, structures and/or devices known to the public may be skipped or represented as block diagrams centering on the core functions of the structures and/or devices. In addition, the same reference numbers will be used throughout the drawings to refer to the same or like parts in this specification.

The embodiments of the present invention can be supported by the disclosed standard documents disclosed for at least one of wireless access systems including IEEE 802 system, 3GPP system, 3GPP LTE system, LTE-A (LTE-Advanced) system and 3GPP2 system. In particular, the steps or parts, which are not explained to clearly reveal the technical idea of the present invention, in the embodiments of the present invention may be supported by the above documents. Moreover, all terminologies disclosed in this document can be supported by the above standard documents.

The following embodiments of the present invention can be applied to a variety of wireless access technologies, for example, CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc.

Although the terms such as "first" and/or "second" in this specification may be used to describe various elements, it is to be understood that the elements are not limited by such terms. The terms may be used to identify one element from another element. For example, a first element may be referred to as a second element, and vice versa within the range that does not depart from the scope of the present invention.

In the specification, when a part "comprises" or "includes" an element, it means that the part further comprises or includes another element unless otherwise mentioned. Also, the terms ". . . unit", ". . . module" disclosed in the specification means a unit for processing at least one function or operation, and may be implemented by hardware, software or combination of hardware and software.

For clarity, the following description focuses on IEEE 802.11 systems. However, technical features of the present invention are not limited thereto.

FIG. 1 is a diagram for an example of a structure of IEEE 802.11 system to which the present invention is applicable.

IEEE 802.11 structure can consist of a plurality of configuration elements and a WLAN supporting mobility of an STA, which is transparent to an upper layer, can be provided by interaction of a plurality of the configuration elements. A basic service set (hereinafter abbreviated BSS) may correspond to a basic configuration block in IEEE 802.11 LAN. FIG. 1 shows an example that there exist two BSSs (BSS 1 and BSS 2) and two STAs are included in each of the BSSs as members, respectively (STA 1 and STA 2 are included in the BSS 1 and STA 3 and STA 4 are included in the BSS 2). In this case, an STA indicates a device operating according to MAC (medium access control)/PHY (physical) standard of IEEE 802.11. An STA includes an AP (access point) STA (simply, an AP) and a non-AP STA. An AP corresponds to a device providing network access (e.g., WLAN) to a non-AP STA via a wireless interface. The AP can be configured by a fixed form or a mobile form and includes a mobile wireless device (e.g., a laptop computer, a smartphone, etc.) providing a hot-spot. The AP corresponds to a base station (BS), a Node-B, an evolved Node-B (eNB), a base transceiver system (BTS), a femto BS and the like in a different wireless communication field. The non-AP STA corresponds to a device directly controlled by a user such as a laptop computer, a PDA, a wireless modem, a smartphone and the like. The non-AP STA can be called a device, a wireless transmit/receive unit (WTRU), a user equipment (UE), a mobile station (MS), a mobile device, a mobile subscriber station (MSS), and the like.

An oval indicating a BSS in FIG. 1 may be comprehended as a coverage area of the STAs included in the BSS to maintain a communication. This area can be called a basic service area (hereinafter abbreviated BSA). A BSS of a most basic type in IEEE 802.11 LAN may correspond to an independent BSS (hereinafter abbreviated IBSS). For instance, the IBSS may have a minimum form consisting of two STAs only. The BSS (BSS 1 or BSS 2), which is the simplest form and omitted different configuration elements, in FIG. 1 may correspond to a representative example of the IBSS. This sort of configuration is available when the STAs are able to directly communicate with each other. And, this kind of LAN can be configured when a LAN is necessary instead of being configured in advance. Hence, this network may be called an ad-hoc network.

When power of an STA is turned on or turned off or an STA enters into a BSS area or gets out of the BSS area, a membership of the STA in a BSS can be dynamically changed. In order to be a member of the BSS, the STA can join the BSS using a synchronization process. In order to access all services based on a BSS structure, the STA can be associated with the BSS.

Figure 2:
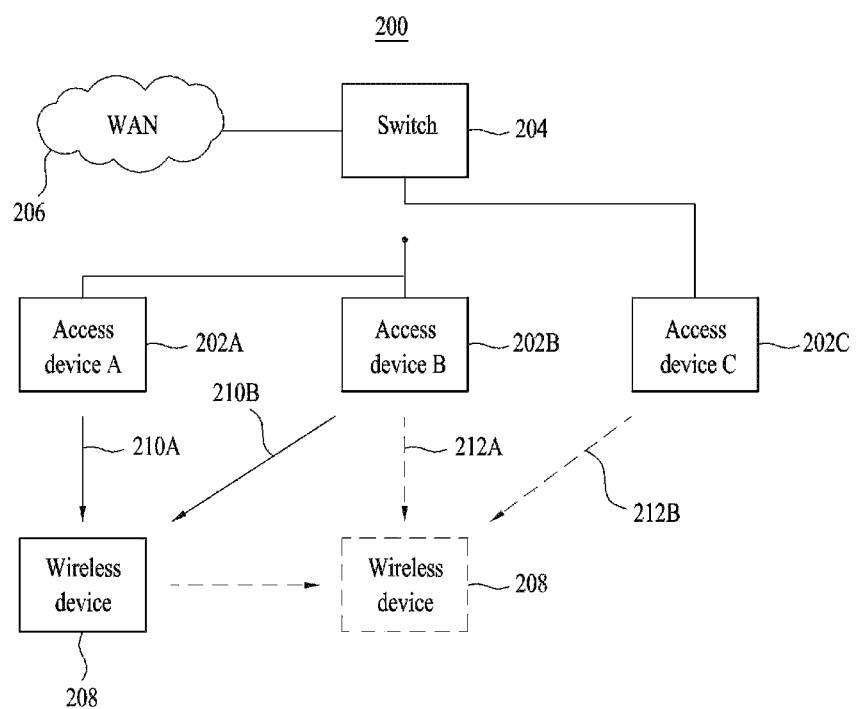
FIG. 2 is a block diagram illustrating an exemplary operation of a communication system employing access devices and wireless devices.

FIG. 2 is a block diagram for an example of a communication system 200 adopting access devices (e.g., AP STAs) 220A/202B/202C and wireless user devices (e.g., non-AP STAs).

Referring to FIG. 2, access devices 202A to 202C are connected with a switch 204 providing access to a WAN (wide area network) 206 such as the Internet. Each of the access devices 202A to 202C provides wireless access to wireless devices belonging to a coverage area (not depicted) of the access device via a time division multiplexed network. Hence, the access devices 202A to 202C commonly provide a total WLAN coverage area of the system 200. For instance, a wireless device 208 may exist in a coverage area of the access devices 202A and 202B in a position represented by a box of a line. Hence, the wireless device 208 can receive beacons from each of the access devices 202A/202B as shown by line arrows 210A and 210B. If the wireless device 208 roams to a dotted line box from the line box, the wireless device 208 enters a coverage area of the access device 202C and leaves a coverage area of the access device 202A. Hence, as shown by dotted lines 212A and 212B, the wireless device 208 can receive beacons from the access devices 202B/202C.

When the wireless device 208 roams in the total WLAN coverage area provided by the system 200, the wireless device 208 can determine which device provides best access to the wireless device 208. For instance, the wireless device 208 repeatedly scans beacons of adjacent access devices and may be able to measure signal strength (e.g., power) related to each of the beacons. Hence, the wireless device 208 can be connected with an access device providing optimal network access based on maximum beacon signal strength. The wireless device 208 may be able to use a different reference related to optimal access. For instance, the optimal access may be associated with more preferable services (e.g., contents, data rate and the like).

Figure 3:
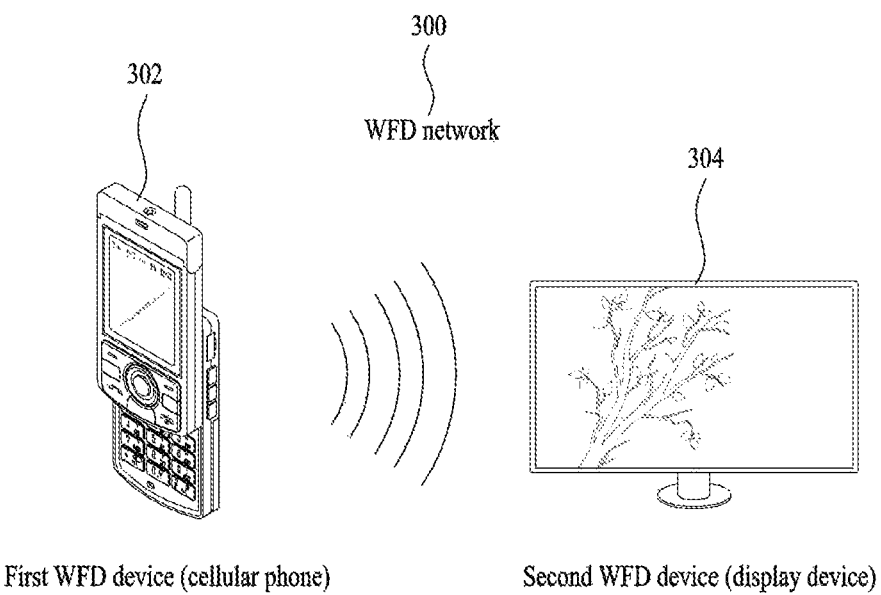
FIG. 3 illustrates a Wi-Fi Direct (WFD) network.

FIG. 3 is a diagram for an example of a WFD (Wi-Fi Direct) network.

A WFD network corresponds to a network capable of performing D2D (device-to-device) (or peer to peer (P2P)) communication although Wi-Fi devices do not participate in a home network, an office network or a hot-spot network. The WFD network is proposed by Wi-Fi alliance. In the following, WFD-based communication is called WFD D2D communication (simply, D2D communication) or WFD P2P communication (simply, P2P communication). And, a device performing the WFD P2P communication is called a WFD P2P device, simply, a P2P device.

Referring to FIG. 3, a WFD network 300 can include at least one or more Wi-Fi devices including a first WFD device 302 and a second WFD device 304. A WFD device includes devices supporting Wi-Fi such as a display device, a printer, a digital camera, a projector, a smartphone and the like. And, the WFD device includes a non-AP STA and an AP STA. Referring to an example shown in the drawing, the first WFD device 302 corresponds to a smartphone and the second WFD device 304 corresponds to a display device. WFD devices in the WFD network can be directly connected with each other. Specifically, P2P communication may correspond to a case that a signal transmission path between two WFD devices is directly configured between the WFD devices without passing through a third device (e.g., an AP) or a legacy network (e.g., access WLAN via an AP). In this case, the signal transmission path directly configured between the two WFD devices may be restricted to a data transmission path. For instance, P2P communication may correspond to a case that a plurality of non-STAs transmit data (e.g., audio/image/text message information etc.) without passing through an AP. A signal transmission path for control information (e.g., resource allocation information for P2P configuration, wireless device identification information and the like) can be directly configured between WFD devices (e.g., between a non-AP STA and a non-AP STA, between a non-AP STA and an AP), between two WFD devices (e.g., between a non-AP STA and a non-AP STA) via an AP or between an AP and a corresponding WFD device (e.g., an AP and a non-AP STA #1, between an AP and a non-AP STA #2).

Figure 4:
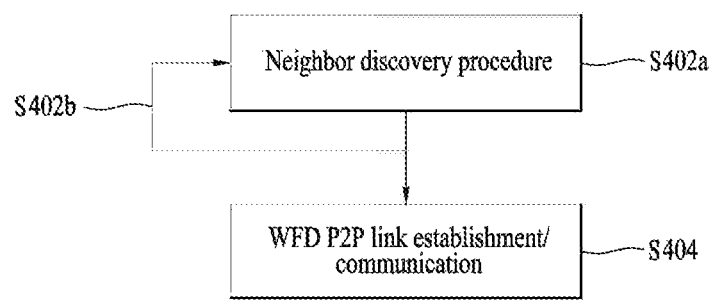
FIG. 4 illustrates a process of constructing a WFD network

FIG. 4 is a flowchart for an example of a procedure of configuring a WFD network.

Referring to FIG. 4, a procedure of configuring a WFD network can be mainly divided into two procedures. A first procedure corresponds to a neighbor (device) discovery (ND) procedure [S402a] and a second procedure corresponds to a P2P link configuration and communication procedure [S404]. A WFD device (e.g., 302 in FIG. 3) finds out a different neighboring device (e.g., 304 in FIG. 3) in coverage (of the WFD device) via the neighbor discovery procedure and may be able to obtain information necessary for associating with the neighboring WFD device, e.g., information necessary for pre-association. In this case, the pre-association may indicate second layer pre-association in a wireless protocol. The information necessary for the pre-association can include identification information on the neighboring WFD device for example. The neighbor discovery procedure can be performed according to an available radio channel [S402b]. Subsequently, the WFD device 302 can perform a WFD P2P link configuration/communication procedure with the different WFD device 304. For instance, the WFD device 302 can determine whether the WFD device 304 corresponds to a WFD device not satisfying a service requirement of a user after the WFD device 302 is connected with the neighboring WFD device 304. To this end, the WFD device 302 is second layer pre-associated with the neighboring WFD device 304 and may be then able to search for the WFD device 304. If the WFD device 304 does not satisfy the service requirement of the user, the WFD device 302 disconnects the second layer connection established with the WFD device 304 and may be able to establish the second layer connection with a different WFD device. On the contrary, if the WFD device 304 satisfies the service requirement of the user, the two WFD devices 302/304 can transceive a signal with each other via a P2P link.

Figure 5:
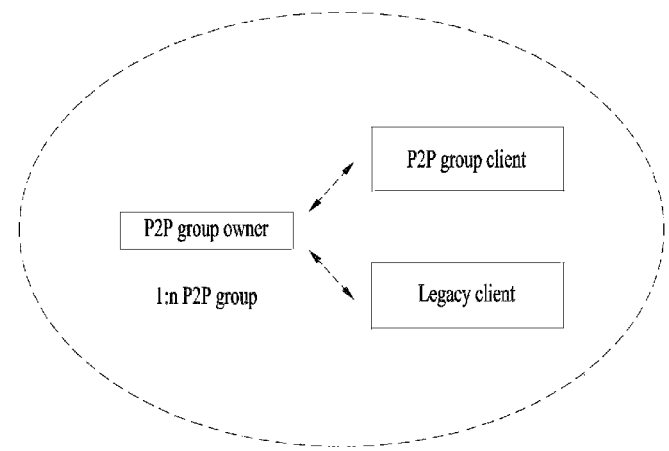
FIG. 5 illustrates a typical P2P network topology.

FIG. 5 is a diagram for a typical P2P network topology.

As shown in FIG. 5, a P2P GO can be directly connected with a client including a P2P function. Or, the P2P GO can be connected with a legacy client, which has no P2P function.

Figure 6:
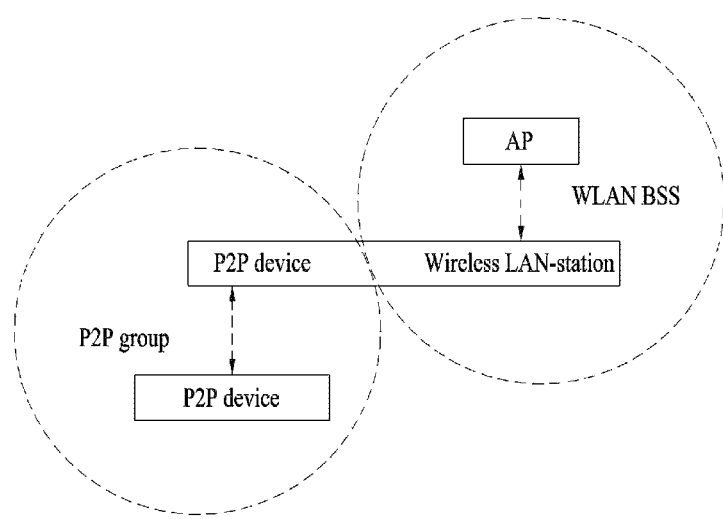
FIG. 6 illustrates a situation in which one P2P device forms a P2P group and, simultaneously, operates as an STA of a WLAN to be connected to an AP.

FIG. 6 is a diagram for a situation that a single P2P device forms a P2P group and is connected with an AP in a manner of operating as an STA of WLAN at the same time.

As shown in FIG. 6, according to P2P technical standard, a situation that a P2P device operates in the aforementioned mode is defined as a concurrent operation.

In order for a series of P2P devices to form a group, a P2P GO is determined based on a group owner intent value of a P2P attribute ID. The group owner intent value may have a value ranging from 0 to 15. P2P devices are exchanging the values and a P2P device including a highest value becomes the P2P GO. Meanwhile, in case of a legacy device not supporting the Wi-Fi P2P technology, although the legacy device can belong to a P2P group, a function of the legacy device is limited to a function of accessing an infrastructure network via the P2P GO.

According to Wi-Fi P2P standard, since a P2P GO transmits a beacon signal using OFDM (orthogonal frequency division multiplexing), a P2P device does not support 11b standard. Instead, 11a/g/n can be used as Wi-Fi P2P device.

In order to perform an operation of connecting a P2P GO and a P2P client with each other, a P2P standard mainly includes 4 functions described in the following.

First of all, P2P discovery is dealing with such a description entry as device discovery, service discovery, group formation and P2P invitation. According to the device discovery, 2 P2P devices exchange device-related information such as a device name of a counterpart device or a device type with each other via an identical channel. According to the service discovery, a service to be used and service-related information are exchanged with each other via P2P. According to the group formation, it corresponds to a function that a device to be a P2P GO is determined and a new group is formed. According to the P2P invitation, it corresponds to a function that a permanently formed P2P group is summoned or a function of making a P2P device join a legacy P2P group.

Secondly, P2P group operation explains P2P group formation and termination, connection to a P2P group, communication in a P2P group, a service for P2P client discovery, operation of a persistent P2P group and the like.

Thirdly, P2P power management is dealing with a method of managing power of a P2P device and a method of processing a signal on power saving mode timing.

Lastly, managed P2P device is dealing with a method of forming a P2P group in a single P2P device and a method of accessing an infrastructure network via a WLAN AP at the same time.

Characteristics of a P2P group are explained in the following. A P2P group is similar to a legacy infrastructure BSS (basic service set) in that a P2P GO plays a role of an AP and a P2P client plays a role of an STA. Hence, software capable of performing a role of a GO and a role of a client should be mounted on a P2P device. The P2P device is distinguished by using a P2P device address such as a MAC address. Yet, when the P2P device performs communication in a P2P group, the P2P device uses a P2P interface address. In this case, it is not necessary for the P2P device to use a single identifier (a globally unique ID) address. The P2P group includes a single identifier P2P group ID. The single identifier P2P group ID consists of a combination of an SSID (service set identifier) and a P2P device address. Wi-Fi P2P standard uses WPA2-PSK/AES for security. A life cycle of a P2P group has a temporary connection method and a persistent connection method for attempting an identical connection after prescribed time. In case of a persistent group, once a P2P group is formed, a role, a certificate, an SSID and a P2P group ID are cached. When connection is reestablished, connection of a group can be promptly established by applying an identical connection form.

In the following, Wi-Fi P2P connection method is explained. A Wi-Fi device mainly performs a connection procedure of two phases. First one corresponds to a phase that two P2P devices find out a counterpart device and a second one corresponds to a group formation phase for determining a role of a P2P GO or a role of a P2P client between discovered devices. First of all, the finding phase corresponds to a phase of connecting P2P devices with each other. In particular, the finding phase includes a search state and a listen state. The search state performs active search using a probe request frame. In this case, a range of the search is restricted for a quick search. For the quick search, such a social channel as a channel 1, 6 and 11 are used. A P2P device of the listen state maintains a reception state in a manner of selecting one channel from the 3 social channels. If the P2P device receives a probe request frame transmitted by a different P2P device of the search state, the P2P device transmits a probe response frame to the different P2P device in response to the probe request frame. P2P devices continuously repeat the search state and the listen state and may be able to arrive at a channel common to the P2P devices. The P2P devices find out a counterpart device and use a probe request frame and a probe response frame to selectively combine with the counterpart device and to discover a device type, a manufacturer, or a friendly device name. In order to check a service existing in the internal of the P2P devices and compatible between the devices, it may use the service discovery. The service discovery is used to determine whether a service provided in the internal of each device is compatible with a different device. According to the P2P standard, a specific service discovery standard is not designated. A user of a P2P device searches for a neighboring P2P device and a service provided by the P2P device and may be then able to connect with a device or a service preferred by the user.

As a second phase, a group formation phase is explained in the following. If a P2P device completes the aforementioned find phase, checking existence of a counterpart device is completed. Based on this, two P2P devices should enter a GO negotiation phase to configure a BSS. The negotiation phase is divided into two sub phases. One is a GO negotiation phase and another is a WPS (Wi-Fi protected setup) phase. In the GO negotiation phase, the two P2P devices negotiate a role of a P2P GO and a role of a P2P client with each other and an operation channel to be used in the internal of a P2P group is configured. In the WPS phase, such a usual job performed in a legacy WPS as exchanging PIN information inputted by a user using a keypad or the like, simple setup via a push button and the like is performed. In a P2P group, a P2P GO plays core role of the P2P group. The P2P GO assigns a P2P interface address, selects an operation channel of the group and transmits a beacon signal including various operation parameters of the group. In the P2P group, a beacon signal can be transmitted by the P2P GO only. A P2P device can quickly check the P2P GO using the beacon signal in a scan phase corresponding to a connection initial phase and performs a role of participating in the group. Or, the P2P GO can initiate a P2P group session by itself or may be able to initiate a session after the method mentioned earlier in the P2P finding phase is performed. Hence, since a value intended to be the P2P GO is controlled by an application or a higher layer service instead of a value fixed by a certain device, a developer can select an appropriate value, which is intended to be the P2P GO, according to a usage of each application program.

Subsequently, P2P addressing is explained in the following. A P2P device uses a P2P interface address in a manner of assigning a P2P interface address using a MAC address in a P2P group session. In this case, the P2P interface address of a P2P GO corresponds to a BSSID (BSS identifier). The BSSID practically corresponds to a MAC address of the P2P GO.

Connection release of a P2P group is explained in the following. If a P2P session is terminated, a P2P GO should inform all P2P clients of termination of a P2P group session via De-authentication. A P2P client can also inform the P2P GO of connection release. In this case, if possible, it is necessary to perform a disassociation procedure. Having received a connection release request of a client, the P2P GO can identify that connection of the P2P client is released. If the P2P GO detects a P2P client making a protocol error or performing an operation of interrupting connection of a P2P group, the P2P GO generates rejection of authentication or a denial of association. In this case, the P2P GO records a concrete failure reason on an association response and transmits the association response to the P2P client.

Figure 7:
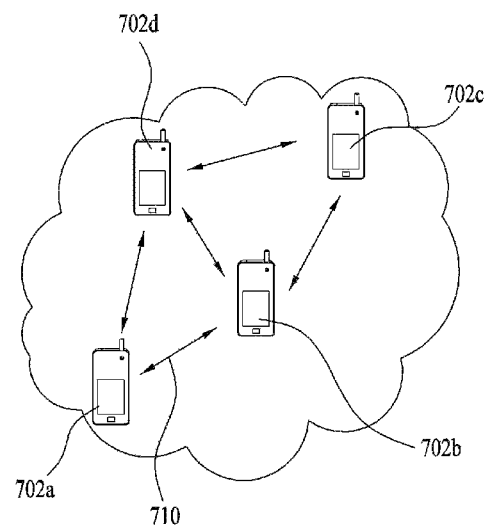
FIG. 7 illustrates a WFD network state when P2P is applied thereto.

FIG. 7 is a diagram for a WFD network aspect in case that P2P is applied.

FIG. 7 shows an example of a WFD network aspect in case of applying a new P2P application (e.g., social chatting, location-based service provision, game interworking and the like). Referring to FIG. 7, a plurality of P2P devices 702a to 702d perform P2P communication 710 in a WFD network. P2P device(s) constructing the WFD network frequently change due to movement of the P2P device or the WFD network itself can be newly generated or disappeared dynamically/in a short time. Hence, characteristic of the new P2P application part is in that P2P communication can be performed and terminated dynamically/in a short time between a plurality of the P2P devices in dense network environment.

Figure 8:
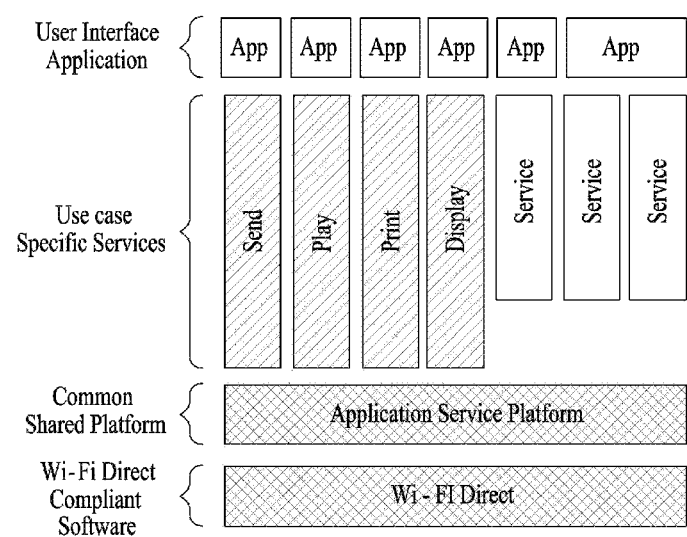
FIG. 8 is a schematic block diagram of a Wi-Fi Direct Services (WFDS) device.

FIG. 8 is a simplified block diagram for a WFDS (Wi-Fi Direct services) device.

A platform for such an application service as an ASP (application service platform) is defined for a Wi-Fi Direct MAC layer and above. The ASP plays a role of session management, command processing of a service, control between ASPs and security between a higher application and a lower Wi-Fi Direct. 4 basic services including a Send service, a Play service, a Display service and a Print service defined by WFDS, a corresponding application and an UI (user interface) are supported at the top of the ASP. In this case, the Send service corresponds to a service capable of performing file transfer between two WFDS devices and an application therefor. The Play service corresponds to a streaming service capable of sharing A/V, a picture, and music based on a DLNA between two WFDS devices and an application therefor. The Print service defines a service capable of outputting a document and a picture between a device including contents such as a document, a picture and the like and a printer and an application therefor. The Display service defines a service enabling screen sharing between Miracast source of WFA and Miracast sink and an application therefor. And, an enablement service is defined for the use of an ASP common platform in case of supporting a third party application except a basic service.

Among terminologies described in the present invention, such a terminology as a service hash is formed from a service name using a first 6 octets of a service hash algorithm (e.g., SHA256 hashing) of a service name. A service hash used by the present invention does not mean a specific service hash. Instead, it may be preferable to comprehend the service hash as a sufficient representation of a service name using a probe request/response discovery mechanism. As a simple example, if a service name corresponds to "org.wifi.example", 6 bytes of a forepart of a value of which the service name is hashed by the SHA256 corresponds to a hash value.

In WFDS, if a hash value is included in a probe request message and a service is matched with each other, it may be able to check whether the service is supported in a manner of responding by a probe response message including a service name. In particular, the service name corresponds to a name of a user readable service of a DNS form. A service hash value indicates upper 6 bytes among a value of 256 bytes of the service name generated by an algorithm (e.g., SHA256). As mentioned in the foregoing example, if a service name corresponds to "org.wifi.example", a service hash may correspond to a value of "4e-ce-7e-64-39-49".

Hence, a part of a value of which a service name is hashed by an algorithm is represented as a service hash (information) in the present invention. The service hash can be included in a message as information.

Method of Configuring Legacy WFDS

Figure 9:
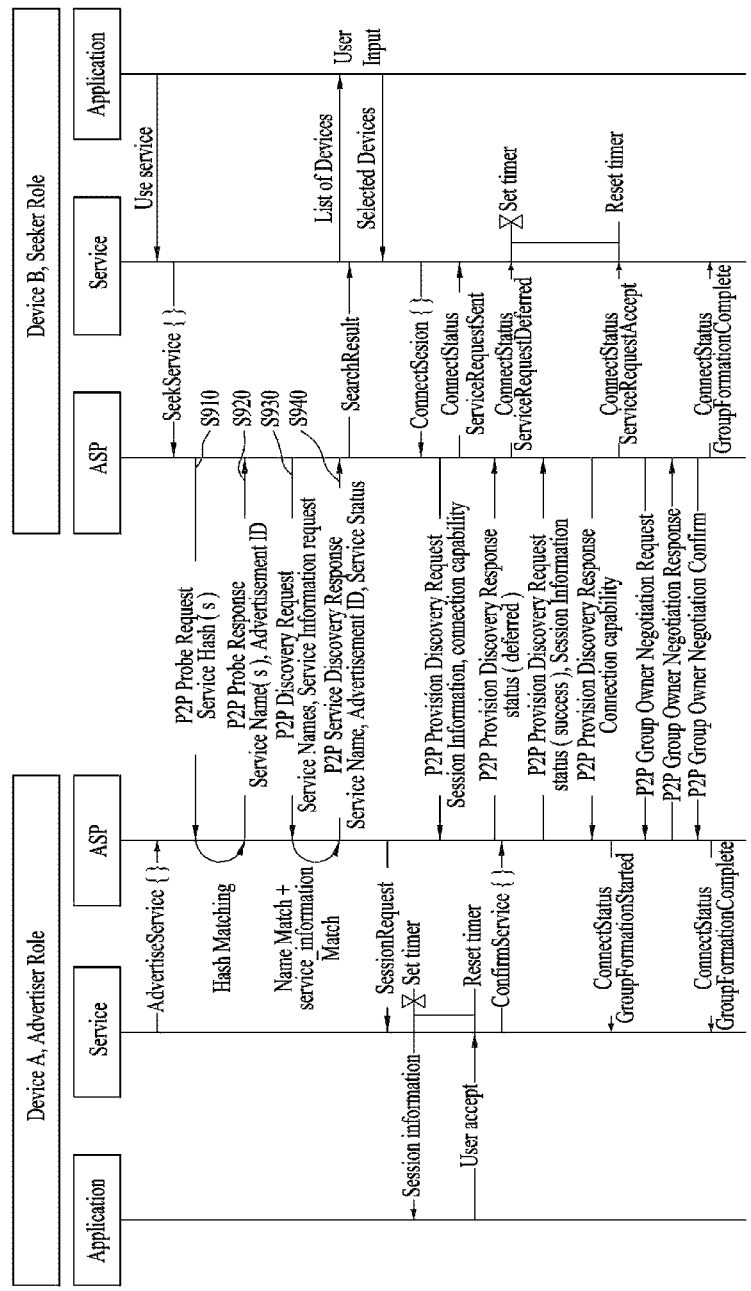
FIG. 9 illustrates a process of performing device discovery and service discovery between WFDS devices to connect a WFDS session in conventional WFDS.

FIG. 9 is a flowchart for a process of establishing a WFDS session by discovering a device and a service between WFDS devices in a legacy WFDS.

For clarity, as shown in FIG. 4, assume that a device A plays a role of an advertiser advertising a WFDS capable of being provided by the device A to a seeker and a device B plays a role in seeking an advertised service. The device A corresponds to a device intending to advertise a service of the device A and a counterpart device intends to start the service in a manner of finding out the service of the device A. The device B performs a procedure of finding out a device supporting a service according to a request of a higher application or a user.

A service end of the device A advertises a WFDS capable of being provided by the service end to an application service platform (ASP) end of the device A. A service end of the device B can also advertise a WFDS capable of being provided by the service end to an ASP end of the device B. In order for the device B to use a WFDS as a seeker, an application end of the device B indicates a service to be used to the service end and the service end indicates the ASP end to find out a target device to use the WFDS.

In order to find out the target device to use the WFDS, the ASP end of the device B transmits a P2P (peer to peer) probe request message [S910]. In this case, the P2P probe request message includes a service name, which is intended to be found out by the ASP end of the device B or is capable of being supported by the ASP end of the device B, in a service hash form in a manner of hashing the service name. Having received the P2P probe request message from the seeker, if the device A supports the corresponding service, the device A transmits a P2P probe response message to the device B in response to the P2P probe request message [S920]. The P2P probe response message includes a service supported by a service name or a hash value and a corresponding advertise ID value. This procedure corresponds to a device discovery procedure indicating that the device A and the device B are WFDS devices. It is able to know whether a service is supported via the device discovery procedure.

Subsequently, it is able to know a specific service in detail via a P2P service discovery procedure, optionally. The device B, which has found a device capable of performing a WFDS with the device B, transmits a P2P service discovery request message to the device [S930]. Having received the P2P service discovery request message from the device B, the ASP end of the device A transmits a P2P service discovery response message to the device B in a manner of matching the service advertised by the service end of the device A with a P2P service name and a P2P service information received from the device B with each other [S940]. In this case, a GAS protocol defined by IEEE 802.11u is used. As mentioned in the foregoing description, when a request for a service search is completed, the device B can inform an application and a user of a search result. At this point, a group of Wi-Fi Direct is not formed yet. If a user selects a service and the selected service performs a connect session, P2P group formation is performed.

In addition, the ASP may operate based on at least one of WFA, WFDS, Wi-Fi Direct, NAN (Neighbor Awareness Networking), NFC (Near Field Communication), and BLE (Bluetooth Low Energy).

Figure 10:
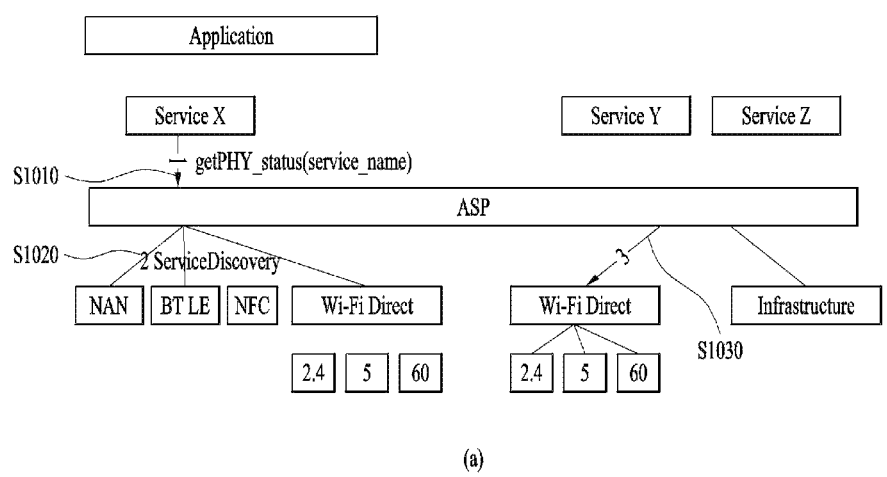
FIG. 10 illustrates a service application platform supporting multiple interfaces.

Referring to FIG. 10, the ASP can support multiple interfaces. For example, the ASP can support multiple interfaces for performing service discovery. In addition, the ASP can support multiple interfaces for performing service connection.

For example, multiple interfaces which perform service discovery may be at least one of Wi-Fi Direct, NAN (Neighbor Awareness Networking), NFC (Near Field Communication), BLE (Bluetooth Low Energy) and WLAN Infrastructure.

In addition, the multiple interfaces which perform service discovery may be at least one of Wi-Fi Direct, P2P and infrastructure. For example, the ASP can support multiple frequency bands. Here, the multiple frequency bands may be 2.4 GHz, 5 GHz and 60 GHz, for example. In addition, the ASP can support information about frequency bands below 1 GHz. That is, the ASP can support multiple frequency bands and the frequency bands are not limited to specific frequency bands.

Referring to FIG. 10, a first device may perform device discovery or service discovery for a first service using the ASP. Then, when device discovery or service discovery has been sought, the first device may perform service connection on the basis of the seeking result. Here, an interface used to seek service discovery and an interface used for service connection may differ from each other and may be selected from the multiple interfaces.

In this case, the ASP may use information or parameters for supporting the above-described multiple interfaces.

With respect to the aforementioned ASP, for example, a service end of a device may acquire information about a service discovery method and a service connection method capable of supporting a first service from the ASP. Here, the first service may be a service provided by the device and is not limited to a specific service.

The service end of the device may call an AdvertiseService( ) or SeekService( ) method from the ASP on the basis of the information acquired from the ASP. That is, the device can use the ASP as an advertiser or a seeker to perform service discovery for the first service, which may be the same as the conventional ASP operation. In addition, the device may perform service connection on the basis of the service discovery result after service discovery for the first service is performed. Here, service connection may be P2P connection or WLAN infrastructure connection. For example, both the service connections support multiple frequency bands and can be performed on the basis of a desired band.

More specifically, referring to FIG. 10a, the service end of the device may call getPHY_status(service_name) method and send a message about a service to be used to the ASP. Here, the service end may receive a return value from the ASP to acquire information on multiple frequency bands with respect to service discovery methods and service connection methods supported by the ASP. Accordingly, the device may notify the ASP of a preferred connection method and a preferred frequency band for the service and acquire information about the service discovery methods and the service connection methods supported by the ASP. The ASP may perform service discovery on the basis of the information received from the service end to seek a specific device and connect the device such that the service can be used.

Here, getPHY_status(service_name) may include information as shown in Table 1, for example. Information shown in right parts of Table 1 is subordinate to information shown at the left of Table 1.

TABLE 1

| Connectivity methods | P2P | Multiband information | 2.4, 5, 60 GHz | |
| --- | --- | --- | --- | --- |
| | Infrastructure information | Multiband information | BSSID 2.4, 5, 60 GHz | Channel Index per band |
| Service Discovery methods | | | NAN | |
| | | | BTLE | |
| | | | NFC | |
| | | | Infrastructure | |
| | P2P | Multiband information | 2.4, 5, 60 GHz | |

Figure 11:
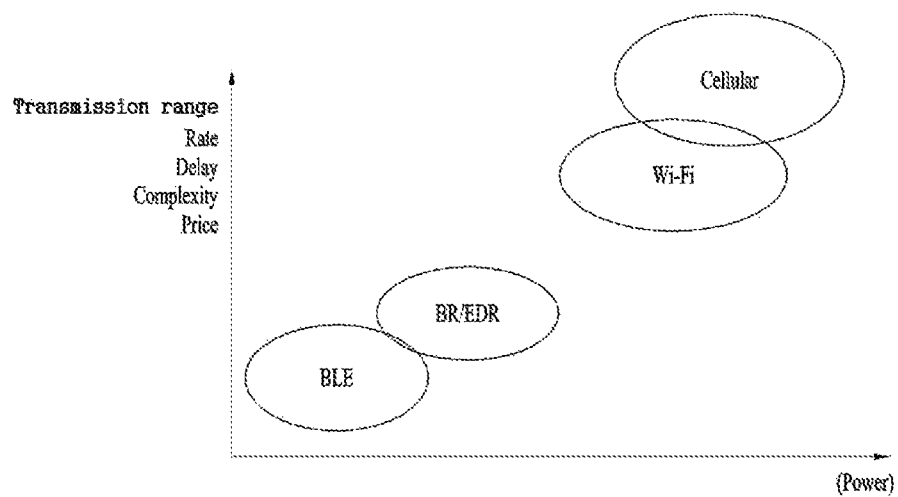
FIG. 11 is a diagram illustrating correlation between power consumption and transmission properties of individual systems.

FIG. 11 is a diagram illustrating correlation between power consumption and transmission properties of individual systems.

Referring FIG. 11, it can be seen that the individual systems have different transmission properties versus power consumption. Specifically, the conventional Wi-Fi or cellular system may consume more power. In this case, a transmission range, data rate, delay, complexity, and price of the Wi-Fi or cellular system may be high. That is, the Wi-Fi or cellular system may cover a wide area using high power.

On the other hand, the BLE system consumes less power and thus, a transmission range, data rate, and the like of the BLE system may be low. That is, the BLE system may cover a small area using low power. In addition, when service discovery is performed using BLE, a discovery speed may be low due to the low power.

In this case, for each service, discovery may be performed based on a different standard according to characteristics of each service. For example, a specific service may prefer less power consumption and be not sensitive to delays. On the contrary, another service may set a high value on the discovery speed. That is, in the case of this service, discovery should be performed rapidly even though power consumption is increased.

In addition, for example, a different discovery method may be configured for each device (terminal) that performs a service. In this case, a different service discovery method may be used according to battery capacity or charging duration. For instance, if a smartphone, a wearable device, a sensor device, and the like are used as the device, different power may be used, and thus, services may be provided by considering their individual situations.

Based on the above discussion, a method for waking up a Wi-Fi infrastructure based on BLE will be described.

More particularly, when a Wi-Fi interface becomes "ON" state using BLE and when a miracast service is initiated by obtaining capability information on wireless communication of a device that supports the miracast service in advance, time delays in negotiation and connection can be reduced.

Figure 12:
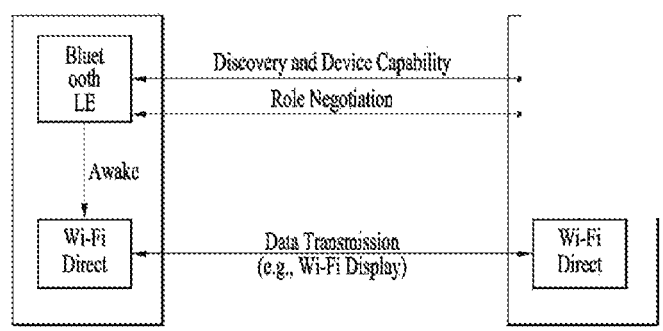
FIG. 12 is a diagram illustrating a method for waking up a Wi-Fi infrastructure through BLE.

Referring to FIG. 12, devices may exchange discovery and device capability information with each other and then exchange information on their roles. Thereafter, the devices may turn on a Wi-Fi interface and perform data transmission based on the Wi-Fi interface. For instance, the devices may provide WFD (or miracast) services.

Figure 13:
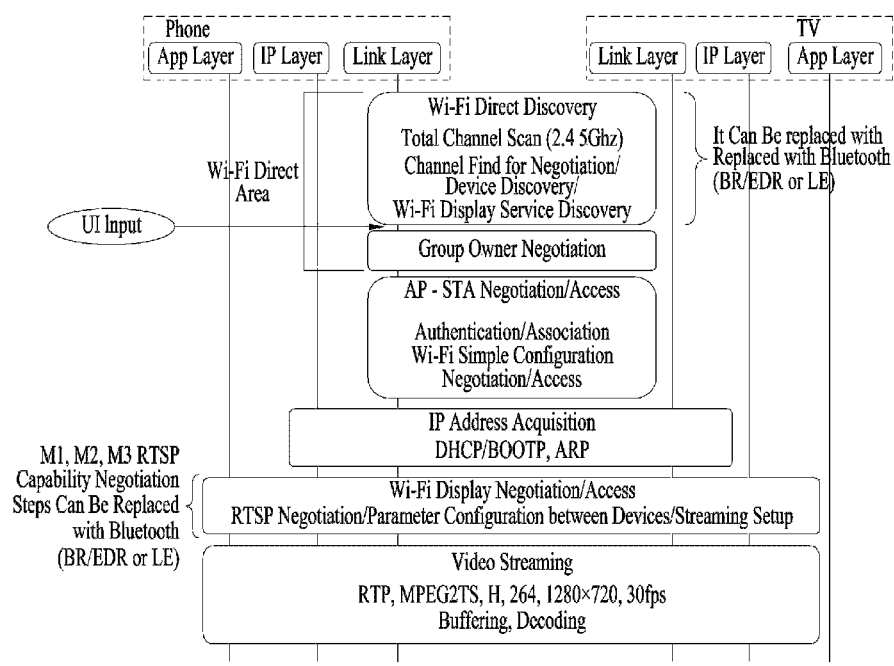
FIG. 13 is a diagram illustrating a method for waking up a Wi-Fi infrastructure through BLE.

For example, referring to FIG. 13, devices may perform discovery based on a Wi-Fi interface. Thereafter, the devices may exchange their capability information to make a connection. In this case, for instance, the devices may be different types of devices including a smartphone, TV, etc., and the present invention is not limited thereto.

In this case, for example, the above-described discovery and capability information exchange between the devices may be performed through a BLE interface rather than the Wi-Fi interface. For example, a Wi-Fi Direct connection procedure, a capability negotiation procedure between WFD service devices, and a session establishment procedure can be simplified, and thus the procedures can be performed through the BLE interface. Therefore, an access time required for the session establishment can be reduced, and unnecessary power consumption can be prevented.

In this case, for example, referring to FIG. 13, discovery of a WFD service supporting device can be performed through the BLE interface rather than the Wi-Fi interface. In addition, according to the present invention, a part of the WFD RTSP capability negotiation procedure (e.g., RTSP M1 to M3 negotiation), which needs to be performed to initiate services after the WFD service device is connected, can be performed during a WFD device discovery procedure using the BLE interface.

For example, since in the RTSP M1 to M3 negotiation procedure, RTSP configuration information is simply exchanged between devices and a configuration parameter for initiating WFD services is not set, the WFD RTSP capability negotiation procedure (M1 to M3) can be performed using BLE in advance. It will be described in detail later. That is, by exchanging and obtaining information on WFD RTSP M1, M2, and M3 parameters in the discovery step through the BLE interface, it is possible to reduce the entire WFD service connection and session establishment time.

Figure 14:
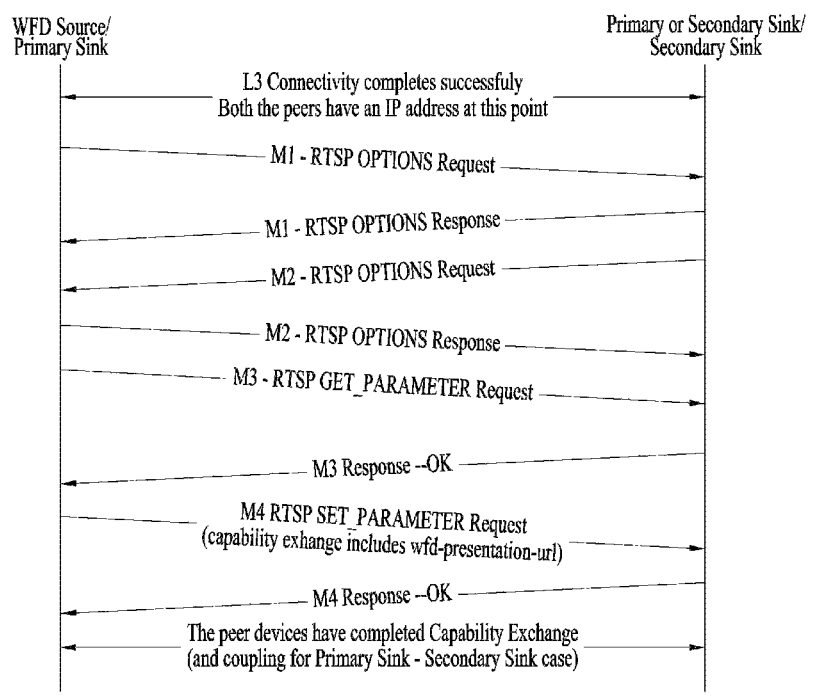
FIG. 14 is a diagram illustrating a method for exchanging Real Time Streaming Protocol (RTSP) messages.

In this case, for example, referring to FIG. 14, a WFD source device and a WFD sink device can perform a session establishment using RTSP messages. Thereafter, the WFD source device may provide, as real-time information, streaming to the WFD sink device through a Real-time Transport Protocol (RTP).

For the session establishment, the WFD source device may transmit an RTSP M1 message to the WFD sink terminal. In this case, the RTSP M1 message may correspond to a message for requesting to initiate an RTSP procedure. Thereafter, the WFD sink device may transmit an RTSP M2 message to the WFD source device. The RTSP M2 message may include information on whether the RTSP procedure can be initiated and information on RTSP options.

Next, the WFD source device and WFD sink device may perform a process for exchanging an RTSP M3 message and RTSP M4 message. In this case, the RTSP M3 message and RTSP M4 message may be for a capability negotiation procedure between the WFD source device and WFD sink device. That is, the WFD source device and WFD sink device may exchange mutual capability information for the session establishment by exchanging the RTSP M3 message and RTSP M4 message. Thereafter, the WFD source device and WFD sink device may achieve the session establishment by exchanging an RTSP M5 message, RTSP M6 message, and RTSP M7 message. In this case, for example, the session establishment between the WFD source device and WFD sink device may be initiated by the RTSP M5 message. Thereafter, the WFD source device and WFD sink device may exchange information on the session establishment through the RTSP M6 message and RTSP M7 message and then achieve the session establishment for providing streaming.

Figure 15:
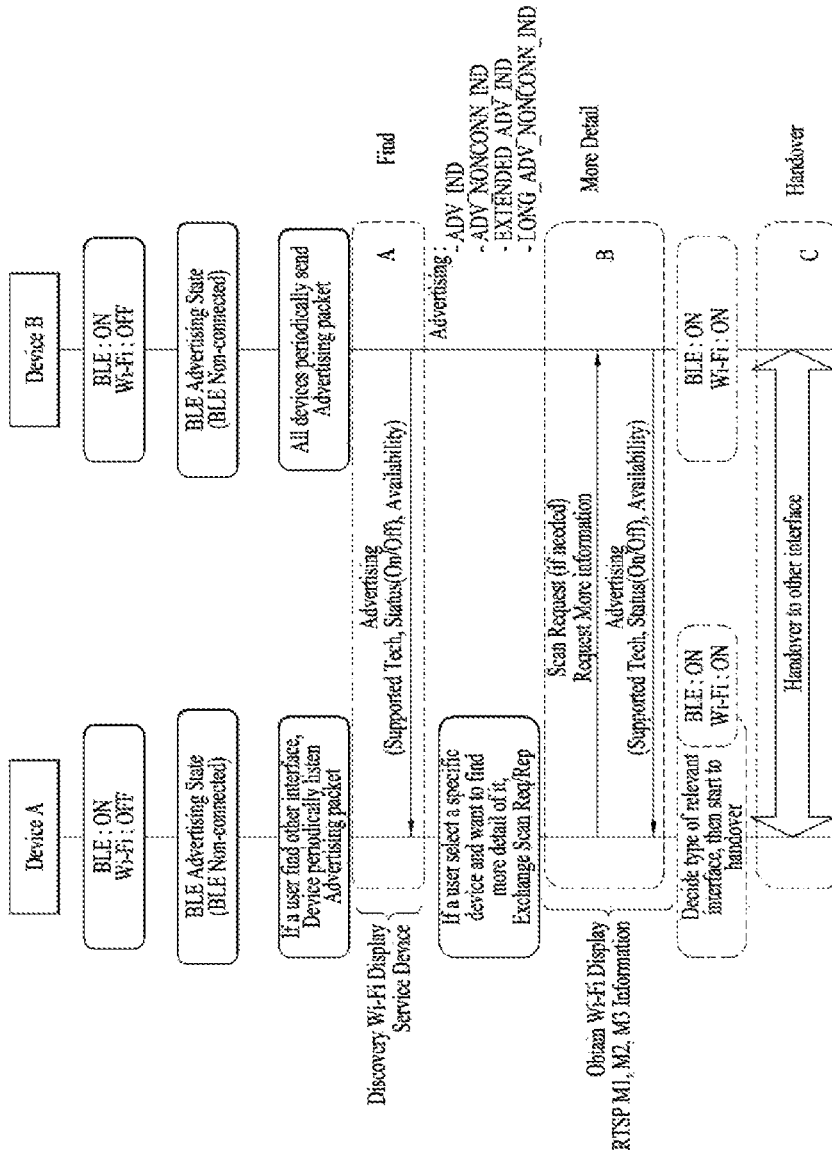
FIG. 15 is a diagram illustrating a method for searching for a Wi-Fi Display (WFD) device (terminal) through BLE and a method for obtaining Real Time Streaming Protocol (RTSP) information.

FIG. 15 shows a method for discovering WFD devices/services and WFD RTSP parameter information through BLE in advance based on the above explanation. For example, if individual devices turn on BLE, the devices can obtain information on whether there is an external interface supported by all neighboring devices, information on an ON/OFF state of the external interface, and information on whether the interface is available, using advertising packets. Thereafter, the devices may obtain detailed information on a specific device in a scanning step and then perform handover to the corresponding interface (e.g., Wi-Fi).

In this case, for example, the individual devices may obtain information on whether a Wi-Fi interface is present, information on an ON/OFF state of the Wi-Fi interface, information on whether the Wi-Fi interface is available, and information on Wi-Fi services (e.g., Wi-Fi Display service, Wi-Fi Serial Bus service, etc.) from the packets exchanged through the BLE interface. In addition, the individual devices may grasp detailed information of the Wi-Fi interface and a specific Wi-Fi service in the scanning step.

Hereinafter, a description will be given of a method performed by each device for obtaining information on RTSP parameters (M1, M2, and M3) for a WFD service in a BLE scanning step, which is performed based on a BLE interface, in advance when the WFD service is discovered in an advertising step.

Figure 16:
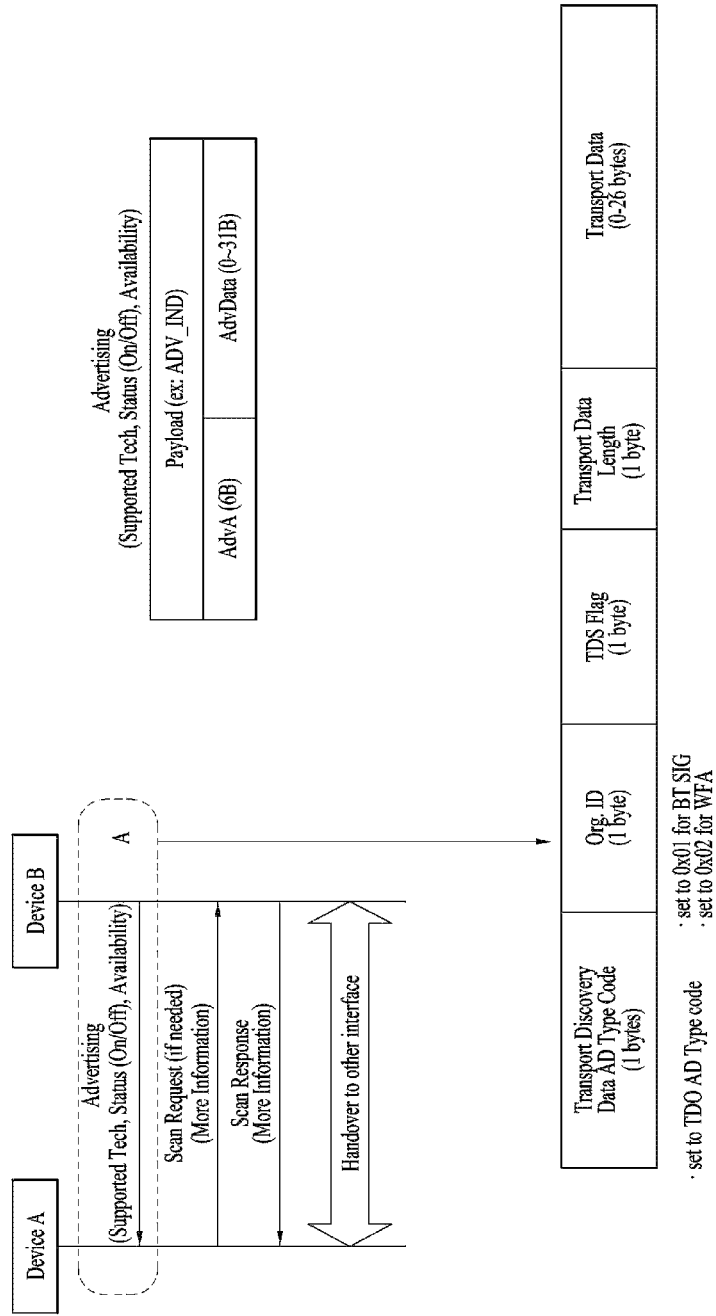
FIG. 16 is a diagram illustrating a method for performing BLE advertising.

For example, FIGS. 16 and 17 show an advertising packet format based on the BLE interface. In this case, the advertising packet format may include transport information (NAN, P2P, WLAN Infra, etc. of an active transport), which is available through an advertising packet. In addition, the advertising packet format may include a service hash field, and information on available services (e.g., Wi-Fi Display, Wi-Fi Serial Bus, etc.) can be obtained through the service has field.

Moreover, for example, the advertising packet format may also include a TDS flag field of the advertising packet. Each bit of the TDS flag field can be defined as shown in Table 2, but the present invention is not limited thereto.

TABLE 2

| TDS Flag | TDS Flag Definition |
|---|---|
| 0-1 | Frame Role:<br>0b00: Not specified<br>0b01: Seeker Only<br>0b10: Provider Only<br>0b11: Both Seeker and Provider |
| 2 | Transport Data Incomplete:<br>0: False<br>1: True(more data in GATT database) |
| 3-4 | Transport State:<br>0b00: Off<br>0b01: On and Available<br>0b10: On and Temporarily Unavailable<br>0b11: Reserved for future use |
| 5-7 | Reserved for future use |

Figure 18:
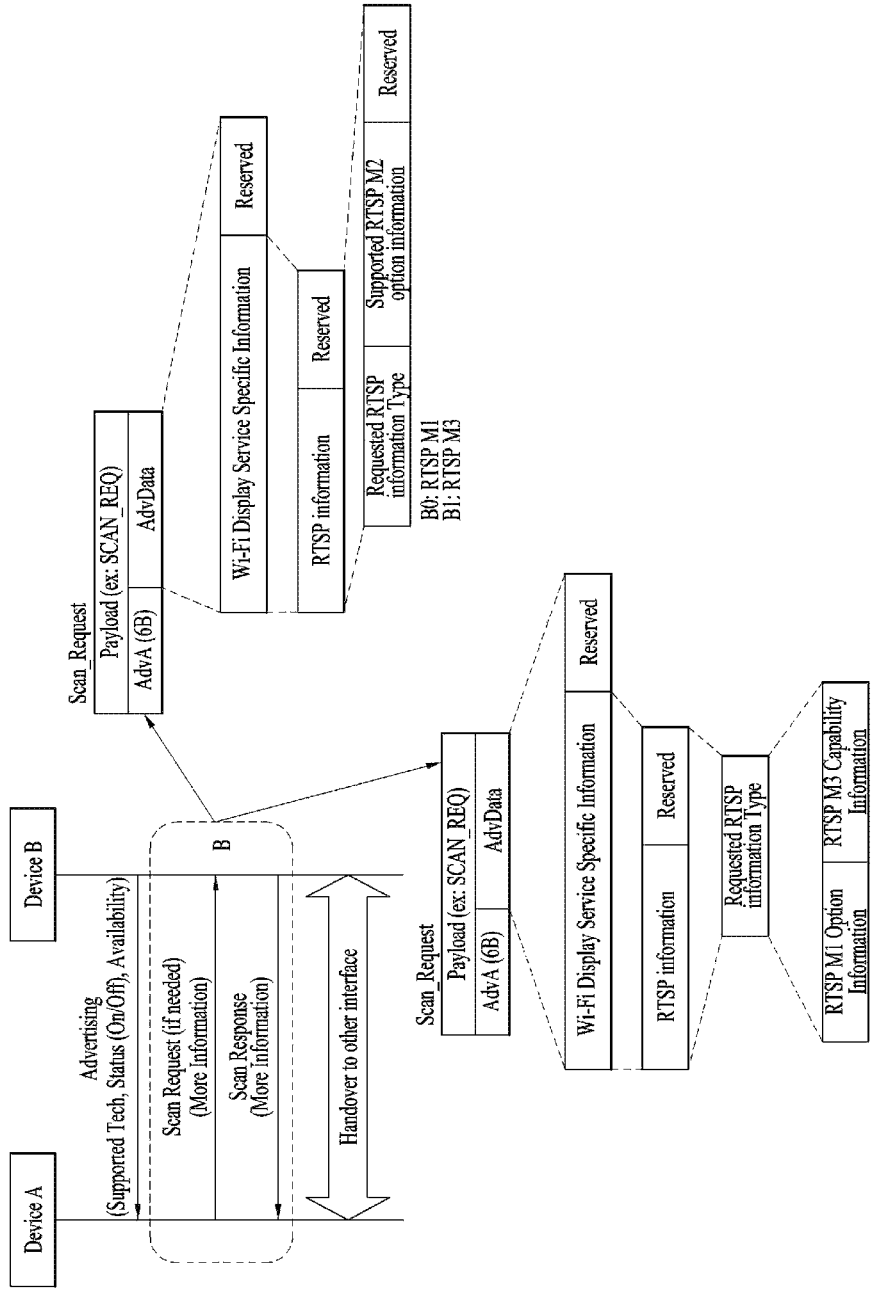
FIG. 18 is a diagram illustrating a method for obtaining WFD RTSP capability information through BLE search.

In addition, FIG. 18 shows a method for obtaining WFD RTSP parameter information in a BLE scanning process in advance.

For example, BLE Scan_Request and BLE Scan_Response messages may be exchanged during the BLE scanning process. In this case, the BLE Scan_Request message may include parameter information for requesting a WFD RTSP parameter, and the BLE Scan_Response message may include response fields corresponding to the fields included in the BLE Scan_Request message.

In addition, for example, referring to FIG. 18, it can be seen that device A and device B correspond to a WFD source device and a WFD sink device, respectively. Moreover, FIG. 18 shows parameters included in the BLE Scan_Request message and BLE Scan_Response message. More specifically, according to the above-described RTSP information exchange procedure, the RTSP M1 message may be used when the source device asks the sink device about RTSP option information (RTSP M1 Request) and the sink device transmits its option information to the source device (RTSP M1 Response). In this case, to drop the above-described M1 message exchange procedure and exchange information corresponding to the M1 message through the BLE interface, the BLE Scan_Response message transmitted from the WFD sink device may include the sink device's RTSP option information (i.e., contents included in the RTSP M1 Response). By doing so, the above-described M1 message exchange procedure can be omitted.

Moreover, for example, according to the WFD RTSP information exchange procedure, the RTSP M2 message may be used when the WFD sink device asks the WFD source device about RTSP option information (RTSP M2 Request) and the WFD source device transmits its option information to the WFD sink device (RTSP M2 Response). Thus, the BLE Scan_Request message transmitted by the WFD source device may include the WFD source device's RTSP option information (i.e., contents included in the RTSP M2 Response). By doing so, the above-described M2 message exchange procedure can be omitted.

Next, according to the WFD RTSP information exchange procedure, the RTSP M3 message may be used when the WFD source device transmits an RTSP M3 Request message to the WFD sink device to check configuration parameter information related to a WFD service of the WFD sink device. The WFD sink device may include its (WFD sink device's) RTSP configuration file information, which is requested from the WFD source device, in an RTSP M3 Response message and then transmit the RTSP M3 Response message to the WFD source device in response to the RTSP M3 Request message. Thus, the BLE Scan_Response message transmitted by the WFD sink device may include the WFD sink device's RTSP parameter information (i.e., contents included in the RTSP M3 Response). By doing so, the above-described M3 message exchange procedure may be omitted.

Additionally, for example, the BLE Scan_Request message may include a field for allowing the WFD source device to send a request for information related to RTSP M1 and M3 to the WFD sink device.

For instance, referring to FIG. 18, a first value of "Requested RTSP Information type" in the BLE Scan_Request message may be used to request M1-related information, and a second value of "Requested RTSP Information type" in the BLE Scan_Request message may be used to request M3-related information (e.g., Bit 0: M1, Bit 1: M3, Bit 2 to Bit 7: Reserved).

In addition, in FIG. 18, the information included in the BLE Scan_Request message and BLE Scan_Response message may be changed to the contrary. That is, the BLE Scan_Request message may include the RTSP M2 related information (i.e., WFD source device's RTSP option information), and the BLE Scan_Response message may include the RTSP M1 information (i.e., WFD sink device's RTSP option information) and RTSP M3 information (i.e., WFD sink device's RTSP configuration parameter information). Thus, the devices can exchange the information exchanged through the RTSP M1 to M3 messages using the BLE interface.

Figure 19:
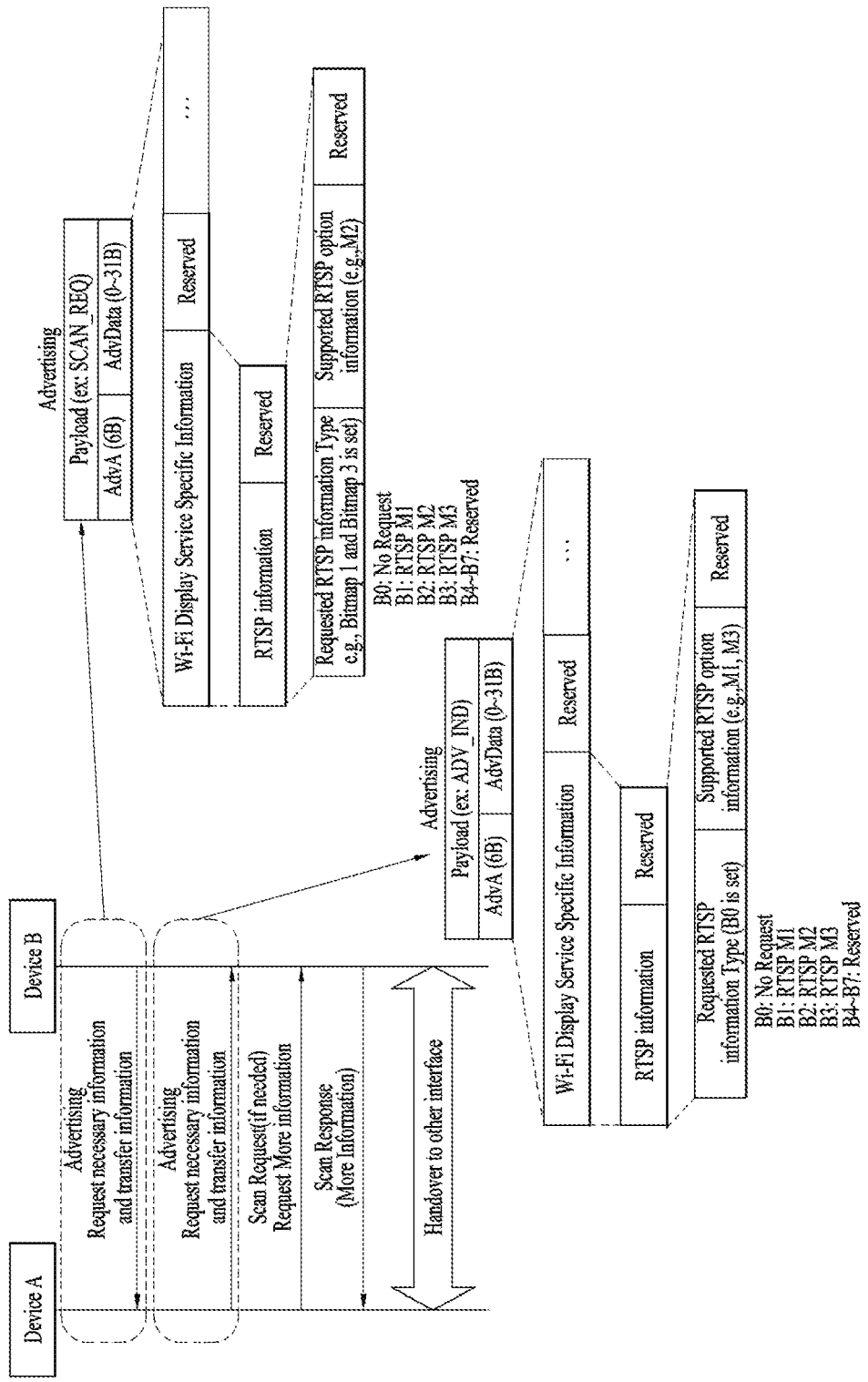
FIG. 19 is a diagram illustrating a method for exchanging WFD RTSP negotiation information through BLE packets.

As another example, referring to FIG. 19, information necessary for WFD RTSP M1, M2, and M3 negotiations can be exchanged through an advertising packet. In this case, a device may request a peer WFD device to transmit the necessary information through the advertising packet. The peer device may transmit RTSP capability negotiation information in response to the request.

More specifically, referring to FIG. 19, a WFD source device (device A) can transmit a request message including "Requested RTSP Information type bitmap" to a WFD sink device (device B) using a BLE advertising packet. In this case, the WFD source device may send a request for RTSP M1 and RTSP M3 negotiation information to the WFD sink device, and at the same time, transmit RTSP option information supported by the WFD source device (i.e., supported RTSP option information transmitted from the WFD source device to the WFD sink device through the RTSP M2 Response) by including the supported RSTSP option information in a "Supported RTSP option information" field. Thereafter, the WFD sink device may respond by transmitting the information requested by the WFD source device (e.g., RTSP M1 and M3). In addition, at the same time, if the WFD sink device has no RTSP negotiation information to be requested, the WFD sink device may respond by setting "Requested RTSP Information Type bitmap" to 0. On the other hand, for example, if the WFD sink device has RTSP negotiation information to be requested, the WFD sink device may set "Requested RTSP Information Type bitmap" to a value corresponding to information that the WFD sink device requests and then transmit it. It should be noted that FIG. 19 is merely an embodiment and the RTSP negotiation information exchange through the advertising packet can be achieved in a different way. In other words, the present invention is not limited to the above-described embodiment.

In summary, the devices can exchange the RTSP-related information through the advertising packet, but the invention is not limited to the above-described embodiment.

Figure 20:
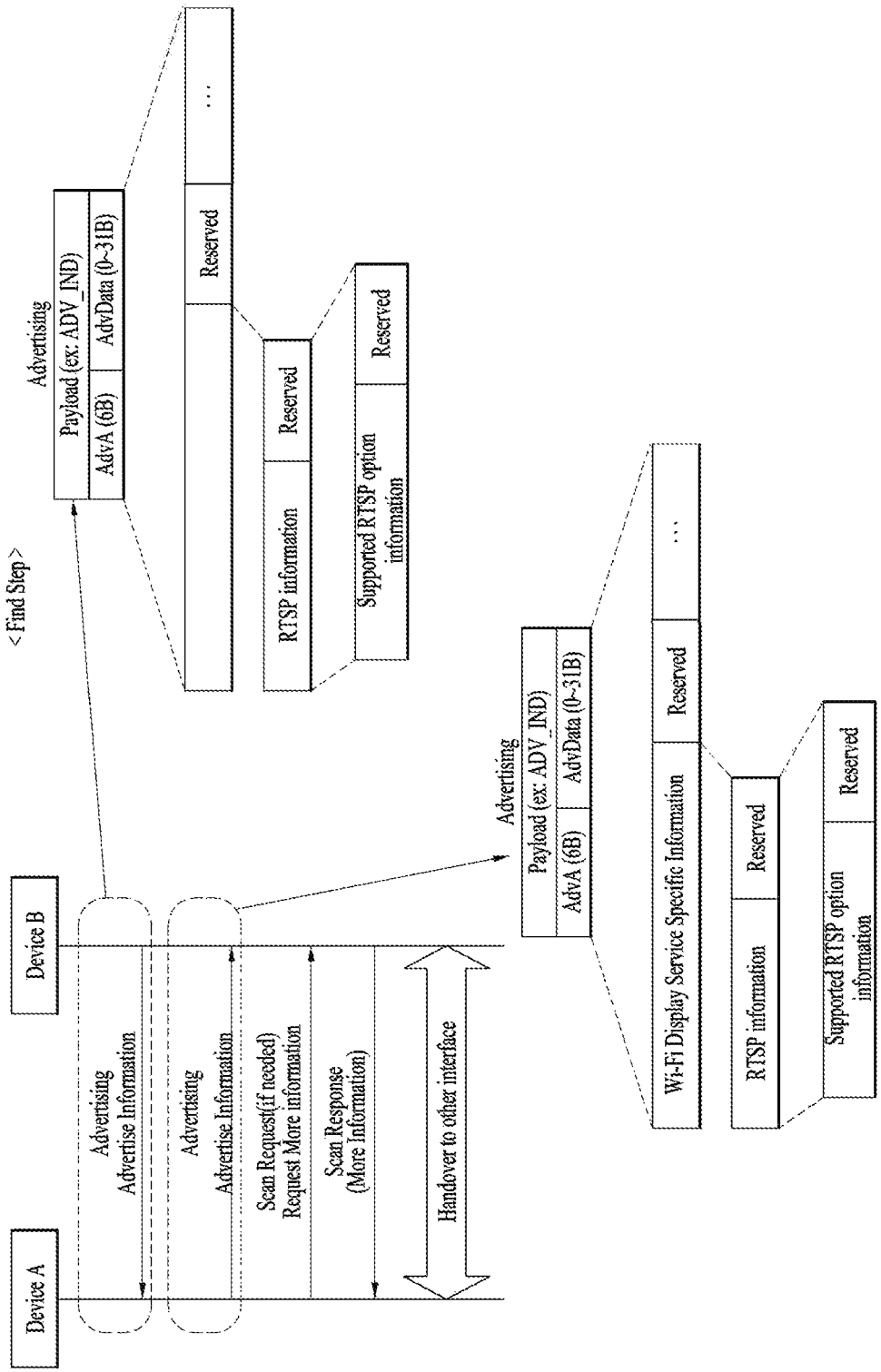
FIG. 20 is a diagram illustrating a method for exchanging WFD RTSP negotiation information through BLE packets.

For example, referring to FIG. 20, RTSP capability negotiation information can be included in an advertising packet in order for a WFD source device and WFD sink device to exchange information with each other. Specifically, each of the WFD source device and WFD sink device may transmit supported RTSP negotiation information to the other device through a "Supported RTSP option information" field to obtain the information.

The above-described method for enabling two devices to exchange RTSP negotiation information through BLE may be performed before the two devices are connected to each other through BLE. However, devices can exchange RTSP negotiation information when the devices are connected to each other through BLE. It will be explained in the following description.

Figure 21:
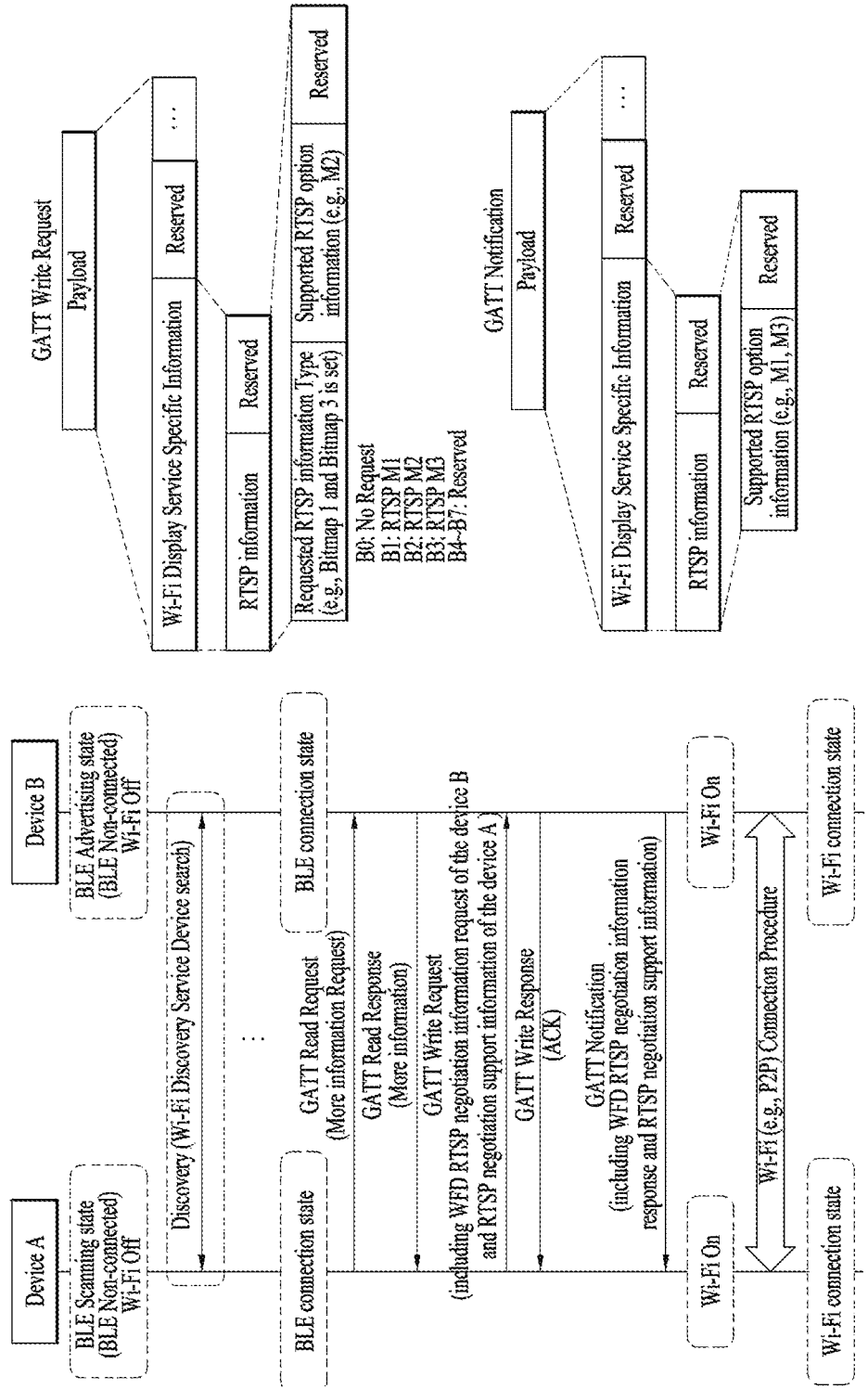
FIG. 21 is a diagram illustrating a method for forwarding RTSP negotiation information using a BLE-related message in a BLE connection state.

As described above, a WFD source device and WFD sink device can exchange RTST-related information in a BLE connection state. For example, referring to FIG. 21, in the BLE connection state, the WFD source device and WFD sink device request WFD RTSP negotiation information through "GATT Write Request message" and "GATT Notification message" and then respond to each other. Specifically, the WFD source device may send a request for RTSP M1 and RTSP M3 negotiation information to the WFD sink device through the GATT Write Request message. In addition, the WFD source device may also transmit its RTSP option information (i.e., RTSP M2) together. The WFD sink device may include the RTSP M1 and RTSP M3 negotiation parameter information requested from the WFD source device in the GATT Notification message and then transmit the GATT Notification message to the WFD source device in response to the GATT Write Request message.

That is, the devices can exchange the information related to RTSP M1 to M3 not only in the step of discovering devices and services through the BLE interface but also by transmitting the information through messages exchanged through the connected BLE interface. However, the present invention is not limited thereto.

As described above, a device supporting BLE can turn on a Wi-Fi interface through BLE and exchange information, which is exchanged through RTSP M1 to M3, in advance. By doing so, the WFD RTSP negotiation procedure and session establishment procedure can be simplified.

Figure 22:
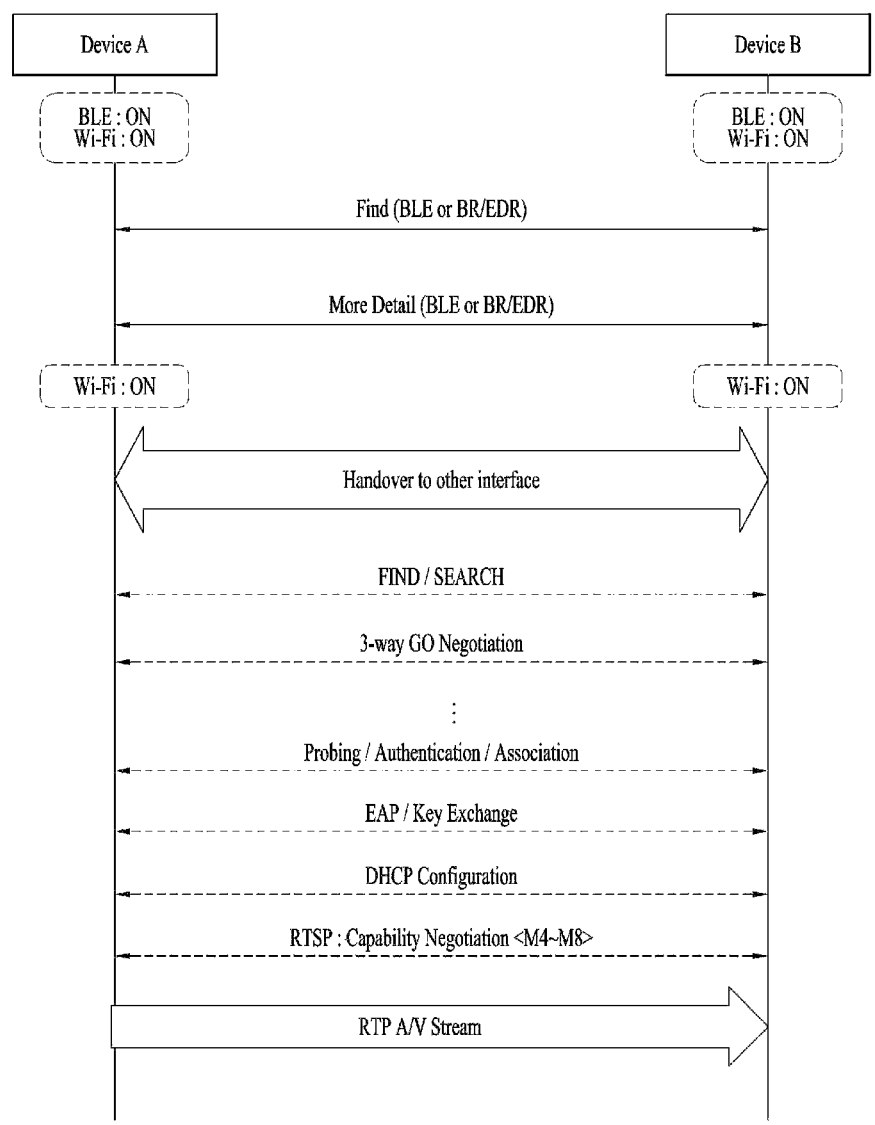
FIG. 22 is a diagram illustrating a method for exchanging WFD RTSP negotiation information.
Figure 23:
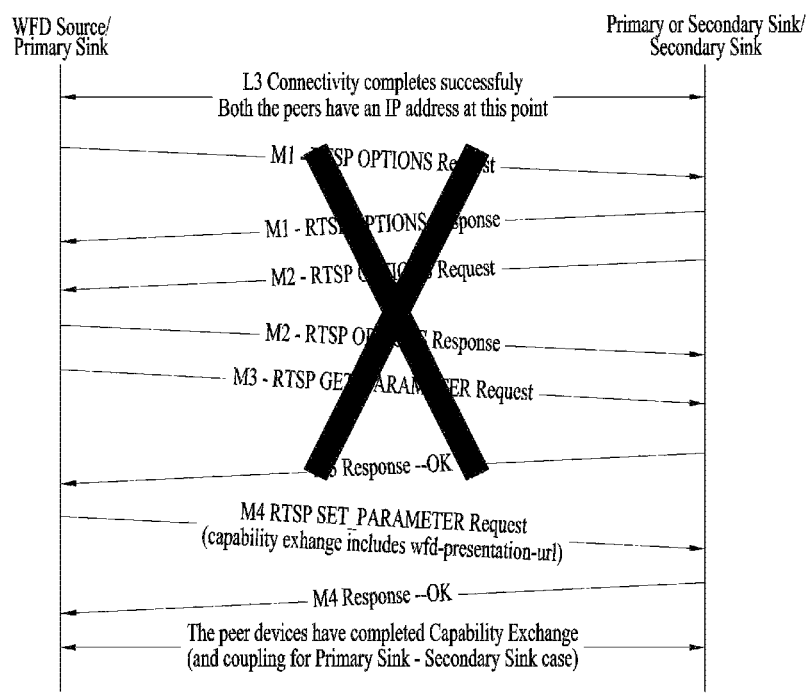
FIG. 23 is a diagram illustrating a method for exchanging WFD RTSP negotiation information.

Based on the above explanation, FIGS. 22 and 23 show processes in which a Wi-Fi interface is turned on through a BLE interface, RTSP M1 to M3 information is exchanged, and then handover to the Wi-Fi interface is performed. That is, when a RTSP capability negotiation for initiating WFD services is performed after a connection between WFD devices (e.g., Wi-Fi Direct or WLAN infrastructure) is established, the WFD devices can directly start an RTSP M4 negotiation process without performing processes for RTSP M1, M2, and M3 negotiations because the information related to RTSP M1, M2, and M3 is obtained through the BLE scanning process.

Figure 24:
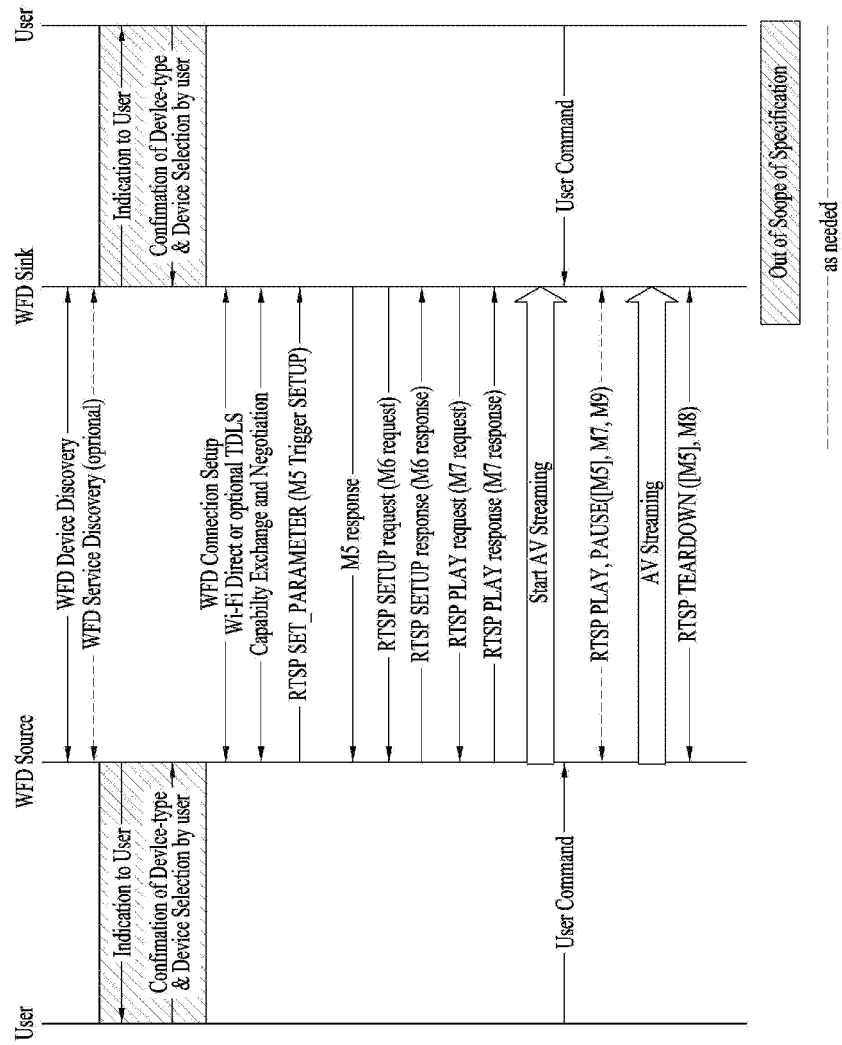
FIG. 24 is a diagram illustrating a method for exchanging WFD RTSP negotiation information.

Next, referring to FIG. 24, WFD devices can perform a WFD session establishment process after completing an RTSP M4 negotiation process and then provide services based on the WFD session establishment.

Figure 25:
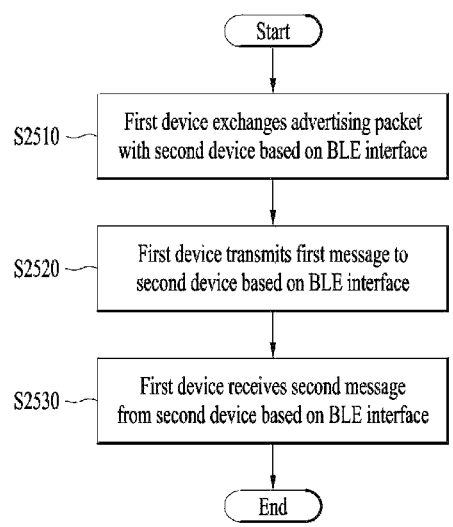
FIG. 25 is a diagram illustrating a method for waking up a Wi-Fi infrastructure based on a BLE interface according to an embodiment of the present invention.

FIG. 25 is a diagram illustrating a method for waking up a Wi-Fi infrastructure based on a BLE interface according to an embodiment of the present invention.

Referring to FIG. 25, a first device can exchange an advertising packet with a second device through a BLE interface [S2510]. In this case, the advertising packet may include information on whether a Wi-Fi interface is turned on as described above with reference to FIGS. 1 to 24. In addition, for example, the advertising packet may further include at least one of: information on whether the Wi-Fi interface is supported; information on whether the Wi-Fi interface is an ON state or an OFF state; information on whether the Wi-Fi interface is available; and information on a Wi-Fi service. That is, the devices can turn on the Wi-Fi interface using the advertising packet. Moreover, for example, the advertising packet may include information related to RTSP M1 to M3 as the above-described information on the WFD service. For instance, using the advertising packet, the first device may send a request for required RTSP-related information to the second device or transmit RTSP-related to the second device. Similarly, using the advertising packet, the second device may send a request for required RTSP-related information to the first device or transmit RTSP-related to the first device. It should be noted that the present invention is not limited thereto.

Next, the first device can transmit a first message to the second device through the BLE interface [S2520]. In addition, the first device can receive a second message from the second device through the BLE interface [S2530]. In this case, as described above with reference to FIGS. 1 to 24, the first message may be a BLE Scan Request message, and the second message may be a BLE Scan Response message. In addition, the first and second devices may exchange the above-described information related to RTSP M1 to M3 through messages used in a step of discovering a device and service through BLE. That is, before a BLE connection, the information related to RTSP M1 to M3 may be exchanged through the BLE scan messages.

As another example, the first message may be a GATT Write Request message, and the second message may be a GATT Notification message. In this case, the GATT Write Request message and GATT Notification message may be exchanged in a state in which the BLE interface is connected. That is, after the BLE connection is established, the devices may exchange the information related to RTSP M1 to M3 by exchanging the messages, but the present invention is not limited thereto.

Moreover, as a further example, RTSP option information may be included in RTSP M1 information, WFD RTSP M2 information, and WFD RTSP M3 information may as described above. In this case, for instance, the first message may contain a field for requesting the WFD RTSP M1 information or WFD RTSP M3 information from the second device and the WFD RTSP M2 information corresponding to RTSP option information of the first device. In this case, the second device may include the WFD RTSP M1 information or WFD RTSP M3 information corresponding to RTSP option information of the second device in the second message and then transmit the second message to the first device. However, the present invention is not limited thereto.

Figure 26:
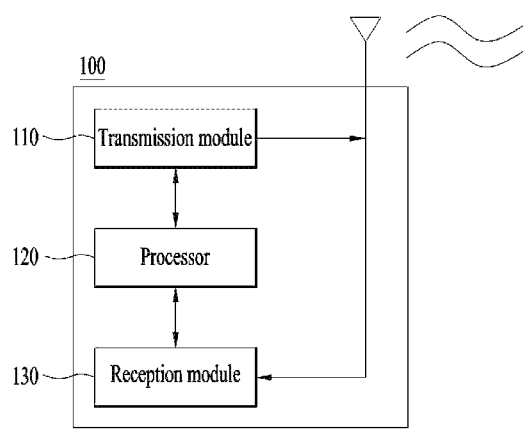
FIG. 26 is a block diagram illustrating a terminal device according to an embodiment of the present invention.

FIG. 26 is a block diagram of a device according to an embodiment of the present invention.

The device may be a device capable of supporting multiple interfaces. Here, the device 100 may include a transmission module 110 which transmits radio signals, a reception module 130 which receives radio signals, and a processor 120 which controls the transmission module 110 and the reception module 130. The device 100 may perform communication with an external device using the transmission module 110 and the reception module 130. Here, the external device may be another device. For example, the external device may be another device connected through P2P, or an AP or a non-AP connected through WLAN infrastructure. Alternatively, the external device may be a base station. That is, the external device may be a device which can perform communication with the device 100 and is not limited to the above-described embodiments. The device 100 may transmit and receive digital data such as content using the transmission module 110 and the reception module 130.

According to an embodiment of the present invention, the processor 120 of the device 100 may establish an ASP session with a second device through a first connection method. Here, the processor 120 may transmit a session handover request to the second device using the transmission module 110. Then, the processor 120 may receive a session handover response from the second device using the reception module 130. Subsequently, the processor 120 may transmit Session Handover Confirm to the second device using the transmission module 110. Here, when the session handover response is received from the second device, the established ASP session may be handed over through a second connection method as described above.

The embodiments of the present invention may be achieved by various means, for example, hardware, firmware, software, or a combination thereof.

In a hardware configuration, the methods according to the embodiments of the present invention may be achieved by one or more ASICs (Application Specific Integrated Circuits), DSPs (Digital Signal Processors), DSPDs (Digital Signal Processing Devices), PLDs (Programmable Logic Devices), FPGAs (Field Programmable Gate Arrays), processors, controllers, microcontrollers, microprocessors, etc.

In a firmware or software configuration, the embodiments of the present invention may be implemented in the form of a module, a procedure, a function, etc. Software code may be stored in a memory unit and executed by a processor. The memory unit may be located at the interior or exterior of the processor and may transmit data to and receive data from the processor via various known means.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

Both a product invention and a process invention are described in the specification and the description of both inventions may be supplementarily applied as needed.

What is claimed is:

1. A method of performing a handover to a Wi-Fi interface based on a Bluetooth Low Energy (BLE) interface by a first station (STA) in a wireless communication system, the method comprising:

receiving a first advertising packet comprising a first field including a first bitmap for a RTSP (Real Time Streaming Protocol) information request type and a second field including first RTSP option information from a second STA via the BLE interface;

transmitting a second advertising packet comprising a third field including a second bitmap for the RTSP information request type and a fourth field including second RTSP option information corresponding to the first bitmap, to the second STA, via the BLE interface, and performing the handover from the BLE interface to the Wi-Fi interface when the first STA transmits the second advertising packet including the second bitmap set to 0, wherein the second bitmap set to 0 indicates that there is no RTSP information request type requested by the first STA.

2. The method of claim 1, wherein the first advertising packet further includes at least one of information on whether the Wi-Fi interface is supported, information on whether the Wi-Fi interface is in an ON state or an OFF state and information on whether the Wi-Fi interface is available.

3. The method of claim 1, wherein the first bitmap is a bitmap requesting information on at least one of WFD RTSP M1 information, WFD RTSP M2 information and WFD RTSP M3 information.

4. The method of claim 2, wherein when the Wi-Fi interface is in the OFF state and the second bitmap is set to 0, the first STA turns on the Wi-Fi interface.

5. A first station (STA) for performing a handover to a Wi-Fi interface based on a Bluetooth Low Energy (BLE) interface in a wireless communication system, the first STA comprising:

a receiver configured to receive information from an external STA;

a transmitter configured to transmit information to the external STA; and a processor configured to control the receiver and the transmitter, the processor is configured to receive a first advertising packet comprising a first field including a first bitmap for an RTSP (Real Time Streaming Protocol) information type and a second field including first RTSP option information from a second STA via the BLE interface, transmit a second advertising packet comprising a third field including a second bitmap for the RTSP information type and a fourth field including second RTSP option information corresponding to the first bitmap to the second STA via the BLE interface, and perform the handover from the BLE interface to the Wi-Fi interface when the first STA transmits the second advertising packet including the second bitmap set to 0, wherein the second bitmap set to 0 indicates that there is no RTSP information request type requested by the first STA.

6. The first STA of claim 5, wherein the first advertising packet further includes at least one of information on whether the Wi-Fi interface is supported, information on whether the Wi-Fi interface is in an ON state or an OFF state, and information on whether the Wi-Fi interface is available.

7. The first STA of claim 5, wherein the first bitmap is a bitmap requesting information on at least one of WFD RTSP M1 information, WFD RTSP M2 information and WFD RTSP M3 information.

8. The first STA of claim 6, wherein when the Wi-Fi interface is in the OFF state and the second bitmap is set to 0, the first STA turns on the Wi-Fi interface.

* * * * *